US007733751B2

United States Patent
Hwang et al.

(10) Patent No.: US 7,733,751 B2
(45) Date of Patent: *Jun. 8, 2010

(54) VERIFICATION METHOD AND APPARATUS

(75) Inventors: Sung-hee Hwang, Suwon-si (KR); Hyo-jin Sung, Seoul (KR); Sung-ryeul Rhyu, Yongin-si (KR)

(73) Assignee: Samsung Electronics, Co., Ltd, Suwon-si (KR)

( * ) Notice: Subject to any disclaimer, the term of this patent is extended or adjusted under 35 U.S.C. 154(b) by 681 days.

This patent is subject to a terminal disclaimer.

(21) Appl. No.: 11/698,830

(22) Filed: Jan. 29, 2007

(65) Prior Publication Data

US 2008/0031112 A1   Feb. 7, 2008

(30) Foreign Application Priority Data

Jun. 30, 2006  (KR) .................. 10-2006-0060687

(51) Int. Cl.
*G11B 5/58* (2006.01)
*G11B 20/10* (2006.01)
*G11B 5/52* (2006.01)
*G01R 31/28* (2006.01)
*G06F 11/00* (2006.01)
*G11C 29/00* (2006.01)

(52) U.S. Cl. .............. 369/53.16; 369/47.14; 369/53.31; 369/53.17; 714/723; 714/715; 714/720; 714/703

(58) Field of Classification Search .............. 369/53.16, 369/53.31

See application file for complete search history.

(56) References Cited

U.S. PATENT DOCUMENTS 6,912,672 B2 *   6/2005   Ko et al. .................. 714/42
2004/0179445 A1 *   9/2004   Park et al. .............. 369/47.14

\* cited by examiner

*Primary Examiner*—Joseph H Feild
*Assistant Examiner*—Nicholas Lee
(74) *Attorney, Agent, or Firm*—NSIP Law

(57) ABSTRACT

A method of verifying whether a recording and/or reproducing apparatus that records and/or reproduces a disc having temporary defect management area (TDMA) information properly produces the TDMA information, the method including producing TDMA information produced by performing a recording test according to a series of recording operations based on a scenario using a blank test disc as test information; and providing a result of the recording test by confirming the test information using reference test information for the recording test.

18 Claims, 27 Drawing Sheets

| The latest TDMS | The latest TDDS | TDDS (2KB) | 64KB |
| --- | --- | --- | --- |
| | The latest SRRI | SRRI (62KB) | |
| | The latest TDFL | The first Cluster | 4*64KB for SL |
| | | The second Cluster | 8*64KB for DL |
| | | ... | (N=4 for SL and |
| | | The Nth Cluster | N=8 for DL) |

File structure of the TDMA mirror file

FIG. 7

| DMA Indicators Cluster (64KB) | 64KB |
|---|---|
| TDMAn Indicator Cluster (64KB) | n*64KB (n = 2 for SL disc and n = 5 for DL disc) |
| ... | |
| TDMA1 Indicator Cluster (64KB) | |

File structure of the TDMA Access Indicators mirror file

FIG. 8

| DMA1 | DDS1+SRRI (4 repetitions) | 4*64KB |
|---|---|---|
| | DFL1 | 4*64KB for SL disc<br>8*64KB for DL disc |
| DMA2 | DDS2+SRRI (4 repetitions) | 4*64KB |
| | DFL2 | 4*64KB for SL disc<br>8*64KB for DL disc |
| DMA3 | DDS3+SRRI (4 repetitions) | 4*64KB |
| | DFL3 | 4*64KB for SL disc<br>8*64KB for DL disc |
| DMA4 | DDS4+SRRI (4 repetitions) | 4*64KB |
| | DFL4 | 4*64KB for SL disc<br>8*64KB for DL disc |

File structure of the DMA mirror file

FIG. 9A

First PSNs of Defective Clusters on TD-S00 disc or L0 of TD-D00 disc (120mm)

| # | PSN | # | PSN | # | PSN | # | PSN |
|---|---|---|---|---|---|---|---|
| 1 | 00 10 38 60h | 51 | 00 35 0F 80h | 101 | 00 65 58 C0h | 151 | 00 8D 9A A0h |
| 2 | 00 10 48 E0h | 52 | 00 37 9E 00h | 102 | 00 66 92 40h | 152 | 00 8F 0D A0h |
| 3 | 00 10 D2 60h | 53 | 00 38 E8 00h | 103 | 00 68 27 E0h | 153 | 00 8F DB E0h |
| 4 | 00 11 8C 00h | 54 | 00 39 6A A0h | 104 | 00 68 B0 00h | 154 | 00 8F E4 20h |
| 5 | 00 11 91 80h | 55 | 00 3C 7A 60h | 105 | 00 68 B9 A0h | 155 | 00 90 D4 C0h |
| 6 | 00 12 82 20h | 56 | 00 3E DA 20h | 106 | 00 68 D7 E0h | 156 | 00 91 04 E0h |
| 7 | 00 12 A3 20h | 57 | 00 3F D9 E0h | 107 | 00 6A 61 20h | 157 | 00 91 5B 80h |
| 8 | 00 14 2D C0h | 58 | 00 40 07 40h | 108 | 00 6A FD E0h | 158 | 00 92 17 E0h |
| 9 | 00 14 D5 80h | 59 | 00 40 8E 00h | 109 | 00 6B 02 00h | 159 | 00 92 C9 40h |
| 10 | 00 16 2D 40h | 60 | 00 41 34 60h | 110 | 00 6B 7F 20h | 160 | 00 92 E4 C0h |
| 11 | 00 18 E3 A0h | 61 | 00 42 59 40h | 111 | 00 6D 82 C0h | 161 | 00 93 04 60h |
| 12 | 00 19 E4 C0h | 62 | 00 43 19 C0h | 112 | 00 6D 91 E0h | 162 | 00 93 66 00h |
| 13 | 00 1A 09 E0h | 63 | 00 44 51 E0h | 113 | 00 6D BB 20h | 163 | 00 93 81 80h |
| 14 | 00 1A BC A0h | 64 | 00 44 69 40h | 114 | 00 6E EC 60h | 164 | 00 94 44 C0h |
| 15 | 00 1B 2E C0h | 65 | 00 45 24 40h | 115 | 00 6F A4 A0h | 165 | 00 94 63 00h |
| 16 | 00 1C 62 C0h | 66 | 00 45 55 C0h | 116 | 00 70 B7 A0h | 166 | 00 95 06 A0h |
| 17 | 00 1D 00 E0h | 67 | 00 45 80 60h | 117 | 00 71 5C A0h | 167 | 00 95 FC C0h |
| 18 | 00 20 16 20h | 68 | 00 47 46 20h | 118 | 00 73 30 20h | 168 | 00 99 37 20h |
| 19 | 00 20 4D 20h | 69 | 00 47 C4 A0h | 119 | 00 73 D6 80h | 169 | 00 99 DC 20h |
| 20 | 00 22 6C 40h | 70 | 00 4B 30 80h | 120 | 00 74 18 80h | 170 | 00 9D 41 20h |
| 21 | 00 23 0E 80h | 71 | 00 4C D1 20h | 121 | 00 74 86 80h | 171 | 00 9D 4D 80h |
| 22 | 00 23 58 C0h | 72 | 00 4C E4 60h | 122 | 00 74 BD 80h | 172 | 00 9D E4 C0h |
| 23 | 00 24 06 00h | 73 | 00 4D A6 40h | 123 | 00 74 C5 C0h | 173 | 00 9E 55 80h |
| 24 | 00 24 58 80h | 74 | 00 4D F8 C0h | 124 | 00 75 B3 A0h | 174 | 00 9F D2 60h |
| 25 | 00 24 F5 40h | 75 | 00 4F 98 00h | 125 | 00 76 70 00h | 175 | 00 A0 9C 80h |
| 26 | 00 25 A6 A0h | 76 | 00 50 24 40h | 126 | 00 76 F5 60h | 176 | 00 A0 D0 C0h |
| 27 | 00 25 B4 60h | 77 | 00 50 BB 80h | 127 | 00 77 78 00h | 177 | 00 A2 E3 80h |
| 28 | 00 28 AF 80h | 78 | 00 51 FE A0h | 128 | 00 79 6D E0h | 178 | 00 A2 E6 40h |
| 29 | 00 28 EA A0h | 79 | 00 52 26 80h | 129 | 00 79 A3 80h | 179 | 00 A3 6A 40h |
| 30 | 00 29 0D 00h | 80 | 00 52 81 40h | 130 | 00 79 E8 40h | 180 | 00 A3 BC C0h |
| 31 | 00 29 6D 40h | 81 | 00 53 CC A0h | 131 | 00 7A DB A0h | 181 | 00 A3 DC 60h |
| 32 | 00 29 ED 20h | 82 | 00 55 11 20h | 132 | 00 7A F3 00h | 182 | 00 A4 37 20h |
| 33 | 00 29 F5 60h | 83 | 00 55 FC 40h | 133 | 00 7B 2C C0h | 183 | 00 A4 5F 00h |
| 34 | 00 2A AC 40h | 84 | 00 57 61 C0h | 134 | 00 7B 9E E0h | 184 | 00 A4 7A 80h |
| 35 | 00 2A F7 E0h | 85 | 00 5A D3 20h | 135 | 00 7E 4E 60h | 185 | 00 A5 10 60h |
| 36 | 00 2B 60 60h | 86 | 00 5B 03 40h | 136 | 00 7E A5 00h | 186 | 00 A6 0E C0h |
| 37 | 00 2C 31 60h | 87 | 00 5B 12 60h | 137 | 00 83 AE C0h | 187 | 00 A7 2B 60h |
| 38 | 00 2D 32 80h | 88 | 00 5C DA E0h | 138 | 00 83 BC 80h | 188 | 00 A7 BF E0h |
| 39 | 00 2D 41 A0h | 89 | 00 5C DC 40h | 139 | 00 84 AE 80h | 189 | 00 AA 2A A0h |
| 40 | 00 2D BD 60h | 90 | 00 5E 70 80h | 140 | 00 84 B1 40h | 190 | 00 AA 64 60h |
| 41 | 00 2E A4 60h | 91 | 00 5F 56 20h | 141 | 00 87 2F 40h | 191 | 00 AC AA 00h |
| 42 | 00 2F 4E E0h | 92 | 00 5F FD E0h | 142 | 00 88 12 20h | 192 | 00 AD AF 40h |
| 43 | 00 31 AD 40h | 93 | 00 60 45 60h | 143 | 00 88 3C C0h | 193 | 00 AF 4B C0h |
| 44 | 00 32 05 40h | 94 | 00 60 99 40h | 144 | 00 88 C2 20h | 194 | 00 B1 B3 C0h |
| 45 | 00 32 27 A0h | 95 | 00 61 52 E0h | 145 | 00 89 A5 00h | 195 | 00 B2 28 A0h |
| 46 | 00 32 7E 40h | 96 | 00 62 72 40h | 146 | 00 89 F2 00h | 196 | 00 B2 C2 A0h |
| 47 | 00 32 D2 20h | 97 | 00 63 05 60h | 147 | 00 8A 73 40h | 197 | 00 B2 EB E0h |
| 48 | 00 33 8A 60h | 98 | 00 63 A4 E0h | 148 | 00 8A 87 E0h | 198 | 00 B5 9F 80h |
| 49 | 00 34 24 60h | 99 | 00 63 A6 40h | 149 | 00 8B 27 60h | 199 | 00 B7 0B E0h |
| 50 | 00 34 E3 80h | 100 | 00 64 74 80h | 150 | 00 8D 0B 60h | 200 | 00 B7 14 20h |

FIG. 9B

First PSNs of Defective Clusters on L1 of TD-D00 disc (120mm)

| # | PSN | # | PSN | # | PSN | # | PSN |
|---|---|---|---|---|---|---|---|
| 201 | 01 42 96 00h | 251 | 01 67 6D 20h | 301 | 01 97 B6 60h | 351 | 01 BF 69 00h |
| 202 | 01 42 A6 80h | 252 | 01 69 FB A0h | 302 | 01 98 EF E0h | 352 | 01 C1 6B 40h |
| 203 | 01 43 30 00h | 253 | 01 6B 45 A0h | 303 | 01 9A 85 80h | 353 | 01 C2 39 80h |
| 204 | 01 43 E9 E0h | 254 | 01 6B C8 40h | 304 | 01 9B 0D A0h | 354 | 01 C2 41 C0h |
| 205 | 01 43 EF 20h | 255 | 01 6E D8 00h | 305 | 01 9B 17 40h | 355 | 01 C3 32 60h |
| 206 | 01 44 DF C0h | 256 | 01 71 37 C0h | 306 | 01 9B 35 80h | 356 | 01 C3 62 80h |
| 207 | 01 45 00 C0h | 257 | 01 72 37 80h | 307 | 01 9C BE C0h | 357 | 01 C3 B9 20h |
| 208 | 01 46 8B 60h | 258 | 01 72 64 E0h | 308 | 01 9D 5B 80h | 358 | 01 C4 75 80h |
| 209 | 01 47 33 20h | 259 | 01 72 EB A0h | 309 | 01 9D 5F A0h | 359 | 01 C5 26 E0h |
| 210 | 01 48 8A E0h | 260 | 01 73 92 00h | 310 | 01 9D DC C0h | 360 | 01 C5 42 60h |
| 211 | 01 4B 41 40h | 261 | 01 74 B6 E0h | 311 | 01 9F E0 60 | 361 | 01 C5 62 00h |
| 212 | 01 4C 42 60h | 262 | 01 75 77 60h | 312 | 01 9F EF 80h | 362 | 01 C5 C3 A0h |
| 213 | 01 4C 67 80h | 263 | 01 76 AF 80h | 313 | 01 A0 18 C0h | 363 | 01 C5 DF 20h |
| 214 | 01 4D 1A 40h | 264 | 01 76 C6 E0h | 314 | 01 A1 4A 00h | 364 | 01 C6 A2 60h |
| 215 | 01 4D 8C 60h | 265 | 01 77 81 E0h | 315 | 01 A2 02 40h | 365 | 01 C6 C0 A0h |
| 216 | 01 4E C0 60h | 266 | 01 77 B3 60h | 316 | 01 A3 15 40h | 366 | 01 C7 64 40h |
| 217 | 01 4F 5E 80h | 267 | 01 77 DE 00h | 317 | 01 A3 BA 40h | 367 | 01 C8 5A 60h |
| 218 | 01 52 73 C0h | 268 | 01 79 A3 C0h | 318 | 01 A5 8D C0h | 368 | 01 CB 94 C0h |
| 219 | 01 52 AA C0h | 269 | 01 7A 22 40h | 319 | 01 A6 34 20h | 369 | 01 CC 39 C0h |
| 220 | 01 54 C9 E0h | 270 | 01 7D 8E 20h | 320 | 01 A6 76 20h | 370 | 01 CF 9E C0h |
| 221 | 01 55 6C 20h | 271 | 01 7F 2E C0h | 321 | 01 A6 E4 20h | 371 | 01 CF AB 20h |
| 222 | 01 55 B6 60h | 272 | 01 7F 42 00h | 322 | 01 A7 1B 20h | 372 | 01 D0 42 60h |
| 223 | 01 56 63 A0h | 273 | 01 80 03 E0h | 323 | 01 A7 23 60h | 373 | 01 D0 B3 20h |
| 224 | 01 56 B6 20h | 274 | 01 80 56 60h | 324 | 01 A8 11 40h | 374 | 01 D2 30 00h |
| 225 | 01 57 52 E0h | 275 | 01 81 F5 A0h | 325 | 01 A8 CD A0h | 375 | 01 D2 FA 20h |
| 226 | 01 58 04 40h | 276 | 01 82 81 E0h | 326 | 01 A9 53 00h | 376 | 01 D3 2E 60h |
| 227 | 01 58 12 00h | 277 | 01 83 19 20h | 327 | 01 A9 D5 A0h | 377 | 01 D5 41 20h |
| 228 | 01 5B 0D 20h | 278 | 01 84 5C 40h | 328 | 01 AB CB 80h | 378 | 01 D5 43 E0h |
| 229 | 01 5B 48 40h | 279 | 01 84 84 20h | 329 | 01 AC 01 20h | 379 | 01 D5 C7 E0h |
| 230 | 01 5B 6A a0h | 280 | 01 84 DE E0h | 330 | 01 AC 45 E0h | 380 | 01 D6 1A 60h |
| 231 | 01 5B CA E0h | 281 | 01 86 2A 40h | 331 | 01 AD 39 40h | 381 | 01 D6 3A 00h |
| 232 | 01 5C 4A c0h | 282 | 01 87 6E C0h | 332 | 01 AD 50 A0h | 382 | 01 D6 94 C0h |
| 233 | 01 5C 53 00h | 283 | 01 88 59 E0h | 333 | 01 AD 8A 60h | 383 | 01 D6 BC A0h |
| 234 | 01 5D 09 E0h | 284 | 01 89 BF 60h | 334 | 01 AD FC 80h | 384 | 01 D6 D8 20h |
| 235 | 01 5D 55 80h | 285 | 01 8D 30 C0h | 335 | 01 B0 AC 00h | 385 | 01 D7 6E 00h |
| 236 | 01 5D BE 00h | 286 | 01 8D 60 E0h | 336 | 01 B1 02 A0h | 386 | 01 D8 6C 60h |
| 237 | 01 5E 8F 00h | 287 | 01 8D 70 00h | 337 | 01 B6 0C 60h | 387 | 01 D9 89 00h |
| 238 | 01 5F 90 20h | 288 | 01 8F 38 80h | 338 | 01 B6 1A 20h | 388 | 01 DA 1D 80h |
| 239 | 01 5F 9F 40h | 289 | 01 8F 39 E0h | 339 | 01 B7 0C 20h | 389 | 01 DC 88 40h |
| 240 | 01 60 1B 00h | 290 | 01 90 CE 20h | 340 | 01 B7 0E E0h | 390 | 01 DC C2 00h |
| 241 | 01 61 02 00h | 291 | 01 91 B3 C0h | 341 | 01 B9 8C E0h | 391 | 01 DF 07 A0h |
| 242 | 01 61 AC 80h | 292 | 01 92 5B 80h | 342 | 01 BA 6F C0h | 392 | 01 E0 0C E0h |
| 243 | 01 64 0A E0h | 293 | 01 92 A3 00h | 343 | 01 BA 9A 60h | 393 | 01 E1 A9 60h |
| 244 | 01 64 62 E0h | 294 | 01 92 F6 E0h | 344 | 01 BB 1F C0h | 394 | 01 E4 11 60h |
| 245 | 01 64 85 40h | 295 | 01 93 B0 80h | 345 | 01 BC 02 A0h | 395 | 01 E4 86 40h |
| 246 | 01 64 DB E0h | 296 | 01 94 CF E0h | 346 | 01 BC 4F A0h | 396 | 01 E5 20 40h |
| 247 | 01 65 2F C0h | 297 | 01 95 63 00h | 347 | 01 BC D0 E0h | 397 | 01 E5 49 80h |
| 248 | 01 65 E8 00h | 298 | 01 96 02 80h | 348 | 01 BC E5 80h | 398 | 01 E7 FD 20h |
| 249 | 01 66 82 00h | 299 | 01 96 03 E0h | 349 | 01 BD 85 00h | 399 | 01 E9 69 80h |
| 250 | 01 67 41 20h | 300 | 01 96 D2 20h | 350 | 01 BE F8 40h | 400 | 01 E9 71 C0h |

FIG. 9C

First PSNs of Defective Clusters on TD-S00 disc or L0 of TD-D00 disc (80mm)

| | The first PSN of Defective Clusters on TD-S00 disc or L0 of TD-D00 disc | | | | |
|---|---|---|---|---|---|
| 1 | 00 10 38 60h | 21 | 00 23 0E 80h | 41 | 00 2E A4 60h | 61 | 00 42 59 40h |
| 2 | 00 10 48 E0h | 22 | 00 23 58 C0h | 42 | 00 2F 4E E0h | 62 | 00 43 19 C0h |
| 3 | 00 10 D2 60h | 23 | 00 24 06 00h | 43 | 00 31 AD 40h | 63 | 00 44 51 E0h |
| 4 | 00 11 8C 00h | 24 | 00 24 58 80h | 44 | 00 32 05 40h | 64 | 00 44 69 40h |
| 5 | 00 11 91 80h | 25 | 00 24 F5 40h | 45 | 00 32 27 A0h | 65 | 00 45 24 40h |
| 6 | 00 12 82 20h | 26 | 00 25 A6 A0h | 46 | 00 32 7E 40h | 66 | 00 45 55 C0h |
| 7 | 00 12 A3 20h | 27 | 00 25 B4 60h | 47 | 00 32 D2 20h | 67 | 00 45 80 60h |
| 8 | 00 14 2D C0h | 28 | 00 28 AF 80h | 48 | 00 33 8A 60h | 68 | 00 47 46 20h |
| 9 | 00 14 D5 80h | 29 | 00 28 EA A0h | 49 | 00 34 24 60h | 69 | 00 47 C4 A0h |
| 10 | 00 16 2D 40h | 30 | 00 29 0D 00h | 50 | 00 34 E3 80h | | |
| 11 | 00 18 E3 A0h | 31 | 00 29 6D 40h | 51 | 00 35 0F 80h | | |
| 12 | 00 19 E4 C0h | 32 | 00 29 ED 20h | 52 | 00 37 9E 00h | | |
| 13 | 00 1A 09 E0h | 33 | 00 29 F5 60h | 53 | 00 38 E8 00h | | |
| 14 | 00 1A BC A0h | 34 | 00 2A AC 40h | 54 | 00 39 6A A0h | | |
| 15 | 00 1B 2E C0h | 35 | 00 2A F7 E0h | 55 | 00 3C 7A 60h | | |
| 16 | 00 1C 62 C0h | 36 | 00 2B 60 60h | 56 | 00 3E DA 20h | | |
| 17 | 00 1D 00 E0h | 37 | 00 2C 31 60h | 57 | 00 3F D9 E0h | | |
| 18 | 00 20 16 20h | 38 | 00 2D 32 80h | 58 | 00 40 07 40h | | |
| 19 | 00 20 4D 20h | 39 | 00 2D 41 A0h | 59 | 00 40 8E 00h | | |
| 20 | 00 22 6C 40h | 40 | 00 2D BD 60h | 60 | 00 41 34 60h | | |

FIG. 9D

First PSNs of Defective Clusters on L1 of TD-D00 disc (80mm)

| | The first PSN of Defective Clusters on L1 of TD-D00 disc | | | | |
|---|---|---|---|---|---|
| 70 | 01 B6 0C 60h | 90 | 01 C3 B9 20h | 110 | 01 D5 41 20h | 130 | 01 E5 49 80h |

| | | | | | |
|---|---|---|---|---|---|
| 70 | 01 B6 0C 60h | 90 | 01 C3 B9 20h | 110 | 01 D5 41 20h | 130 | 01 E5 49 80h |
| 71 | 01 B6 1A 20h | 91 | 01 C4 75 80h | 111 | 01 D5 43 E0h | 131 | 01 E7 FD 20h |
| 72 | 01 B7 0C 20h | 92 | 01 C5 26 E0h | 112 | 01 D5 C7 E0h | 132 | 01 E9 69 80h |
| 73 | 01 B7 0E E0h | 93 | 01 C5 42 60h | 113 | 01 D6 1A 60h | 133 | 01 E9 71 C0h |
| 74 | 01 B9 8C E0h | 94 | 01 C5 62 00h | 114 | 01 D6 3A 00h | | |
| 75 | 01 BA 6F C0h | 95 | 01 C5 C3 A0h | 115 | 01 D6 94 C0h | | |
| 76 | 01 BA 9A 60h | 96 | 01 C5 DF 20h | 116 | 01 D6 BC A0h | | |
| 77 | 01 BB 1F C0h | 97 | 01 C6 A2 60h | 117 | 01 D6 D8 20h | | |
| 78 | 01 BC 02 A0h | 98 | 01 C6 C0 A0h | 118 | 01 D7 6E 00h | | |
| 79 | 01 BC 4F A0h | 99 | 01 C7 64 40h | 119 | 01 D8 6C 60h | | |
| 80 | 01 BC D0 E0h | 100 | 01 C8 5A 60h | 120 | 01 D9 89 00h | | |
| 81 | 01 BC E5 80h | 101 | 01 CB 94 C0h | 121 | 01 DA 1D 80h | | |
| 82 | 01 BD 85 00h | 102 | 01 CC 39 C0h | 122 | 01 DC 88 40h | | |
| 83 | 01 BE F8 40h | 103 | 01 CF 9E C0h | 123 | 01 DC C2 00h | | |
| 84 | 01 BF 69 00h | 104 | 01 CF AB 20h | 124 | 01 DF 07 A0h | | |
| 85 | 01 C1 6B 40h | 105 | 01 D0 42 60h | 125 | 01 E0 0C E0h | | |
| 86 | 01 C2 39 80h | 106 | 01 D0 B3 20h | 126 | 01 E1 A9 60h | | |
| 87 | 01 C2 41 C0h | 107 | 01 D2 30 00h | 127 | 01 E4 11 60h | | |
| 88 | 01 C3 32 60h | 108 | 01 D2 FA 20h | 128 | 01 E4 86 40h | | |
| 89 | 01 C3 62 80h | 109 | 01 D3 2E 60h | 129 | 01 E5 20 40h | | |

FIG. 10

| The first TDMS Update Unit | Initialized TDFL (2KB) | |
| --- | --- | --- |
| | 00h (58KB) | |
| | Initialized SRRI (2KB) | |
| | Initialized TDDS (2KB) | |
| Intermediate TDMS Update Units | (M-1)*64KB – 2KB | The latest TDFL and the latest SRRI are pointed in the latest TDDS |
| The latest TDMS Update Unit | | |
| | The latest TDDS (2KB) | |

File structure of the TDMA image file

FIG. 11

| TDMAn Indicator Cluster | 1st copy of TDDS (2KB) | |
| --- | --- | --- |
| | ... | |
| | 32nd copy of TDDS (2KB) | |
| ... | ... | n*64KB |
| TDMA1 Indicator Cluster | 1st copy of TDDS (2KB) | |
| | ... | |
| | 32nd copy of TDDS (2KB) | |

File structure of the TDMA Access Indicators image file

FIG. 12

| 1st Cluster | 1st PSN of the Physical Cluster which this Cluster will be recorded on (4bytes) + 00h (2044 bytes) | 64KB |
|---|---|---|
| | 2nd PSN of the Physical Cluster which this Cluster will be recorded on (4bytes) + 00h (2044 bytes) | |
| | ... | |
| | 32nd PSN of the Physical Cluster which this Cluster will be recorded on (4bytes) + 00h (2044 bytes) | |
| 2nd Cluster | 1st PSN of the Physical Cluster which this Cluster will be recorded on (4bytes) + 00h (2044 bytes) | 64KB |
| | 2nd PSN of the Physical Cluster which this Cluster will be recorded on (4bytes) + 00h (2044 bytes) | |
| | ... | |
| | 32nd PSN of the Physical Cluster which this Cluster will be recorded on (4bytes) + 00h (2044 bytes) | |
| ... | | |
| Nth Cluster | 1st PSN of the Physical Cluster which this Cluster will be recorded on (4bytes) + 00h (2044 bytes) | 64KB |
| | 2nd PSN of the Physical Cluster which this Cluster will be recorded on (4bytes) + 00h (2044 bytes) | |
| | ... | |
| | 32nd PSN of the Physical Cluster which this Cluster will be recorded on (4bytes) + 00h (2044 bytes) | |

File structure of the Disc image file

FIG. 14

Test mode and Test condition for each Test mode

| Recording Mode | Test Mode | |
|---|---|---|
| DM-on and LOW-off (SRM without LOW) | "Recording Operation" | Recording |
| | | Disc Closing |
| | "Reading & Modification" | Reading |
| | | Modification |
| DM-on and LOW-on (SRM with LOW) | "Recording Operation" | Recording |
| | | Disc Closing |
| | "Reading & Modification" | Reading |
| | | Modification |

FIG. 15

Test process vs. Test disc and Checking Items

| Test process | | | Test Disc (80mm/120mm) | | Checking items |
|---|---|---|---|---|---|
| | | | SL | DL | |
| DM-on and LOW-off (SRM without LOW) | "Recording Operation" | Recording | TD-S00 | TD-D00 | Check TDMA structure compliance. Check TDMA Access Indicators compliance. Check whether TDFL contains TDFL entries, which were generated by known defects based on recording locations of test scenario. Check whether SRRI entries comply with recorded status based on recording scenario. |
| | | Disc Closing | TD-S01 | TD-D01 | Check DMA structure compliance. Check TDMA Access Indicators compliance. Check whether DMS is identical to the latest TDMS. |
| | "Reading & Modification" | Reading | TD-S10 | TD-D10 | Check data conformance based on TDFL entries. |
| | | Modification | TD-S10 | TD-D10 | Check TDMA structure compliance. Check TDMA Access Indicators compliance. Check whether TDFL contains TDFL entries, which were generated by known defects based on recording locations of test scenario. Check whether SRRI entries comply with recorded status based on recording scenario. |
| DM-on and LOW-on (SRM with LOW) | "Recording Operation" | Recording | TD-S00 | TD-D00 | Check TDMA structure compliance. Check TDMA Access Indicators compliance. Check whether TDFL contains TDFL entries, which were generated by known defects and/or LOW based on recording locations of test scenario. Check whether SRRI entries comply with recorded status based on recording scenario. |
| | | Disc Closing | TD-S02 | TD-D02 | Check DMA structure compliance. Check TDMA Access Indicators compliance. Check whether DMS is same as the latest TDMS. |
| | "Reading & Modification" | Reading | TD-S20 | TD-D20 | Check data conformance based on TDFL entries. |
| | | Modification | TD-S20 | TD-D20 | Check TDMA structure compliance. Check TDMA Access Indicators compliance. Check whether TDFL contains TDFL entries, which were generated by known defects and/or LOW based on recording locations of test scenario. Check whether SRRI entries comply with recorded status based on recording scenario. |

FIG. 18

Checklist for TDMA Access Indicators verification

| Class | Items | RBP | # of bytes | Expected value |
|---|---|---|---|---|
| TDMA Access Indicators | Location of indicator Clusters | NA | NA | SL: 00 0E E0 00h – 00 0E E0 5Fh<br>DL: 00 0E E0 00h – 00 0E E0 BFh |
| | Marked status of indicator Clusters | NA | NA | Shall indicate TDMA which is currently in use. |
| | Error condition of indicator Clusters | NA | NA | No uncorrectable error |
| | Contents of indicator Clusters | NA | NA | Shall be 32 copies of TDDS |
| | Unused area | | | Shall be unrecorded |
| | Integrity of indicator Clusters | NA | NA | - |

RBP: Relative byte position from start byte of each DDS and DFL

FIG. 19

Checklist for TDMA verification

| Class | Items | RBP | # of bytes | Expected value |
|---|---|---|---|---|
| TDMA | Location of TDMAs | NA | NA | |
| | Location of the latest TDDS | NA | NA | The last Data Frame of the last of the Clusters constituting a TDMS |
| | Error condition of the latest TDDS | NA | NA | No uncorrectable error |
| | Error condition of the latest TDFL | NA | NA | No uncorrectable error |
| | Error condition of the latest SRRI | NA | NA | No uncorrectable error |
| | Additional TDMA_size fields in the latest TDDS | 1040 to 1051 | 12 | Shall be same as those of the indicator Clusters |
| | Pointers for TDFL in the latest TDDS | 1120 to 1151 | 32 | Shall be addresses in same TDMA and addresses in the TDMA which is currently in use known by indicator Clusters. |
| | Pointer for SRRI in the latest TDDS | 1184 to 1187 | 4 | |

RBP: Relative byte position from start byte of each DDS and DFL

FIG. 20

Checklist for DMA verification

| Class | Items | RBP | # of bytes | Expected value |
|---|---|---|---|---|
| DMA | Location of DMAs 1,2,3 and 4 | NA | NA | |
| | Error condition of 16 DDS | NA | NA | No uncorrectable error |
| | DDS Update Count | NA | NA | Shall be same as that of the latest TDDS |
| | Contents of 4 DDS1 in DMA1 | NA | NA | Shall be identical |
| | Contents of 4 DDS2 in DMA2 | NA | NA | Shall be identical |
| | Contents of 4 DDS3 in DMA3 | NA | NA | Shall be identical |
| | Contents of 4 DDS4 in DMA4 | NA | NA | Shall be identical |
| | Error condition of 4 DFL | NA | NA | No uncorrectable error |
| | DFL Update Count | NA | NA | Shall be same as that of the latest TDFL |
| | Contents of 4 DFL | NA | NA | Shall be identical |

RBP: Relative byte position from start byte of each DDS and DFL

FIG. 21A

Checklist for TDDS verification

| Class | Items | Data Frame | RBP | # of bytes | Expected value |
|---|---|---|---|---|---|
| TDDS | TDDS identifier | 31 | 0 | 2 | 4453h |
| | TDDS format | 31 | 2 | 1 | 00h |
| | Reserved and set to 00h | 31 | 3 | 1 | 00h |
| | TDDS Update Count | 31 | 4 | 4 | N |
| | Reserved and set to 00h | 31 | 8 | 8 | 00h |
| | First PSN of Drive Area | 31 | 16 | 4 | P_DA |
| | Reserved and set to 00h | 31 | 20 | 4 | 00h |
| | First PSN of Defect List | 31 | 24 | 4 | 00h |
| | Reserved and set to 00h | 31 | 28 | 4 | 00h |
| | Location of LSN 0 of User Data Area | 31 | 32 | 4 | 00 12 00 00h |
| | Last LSN of User Data Area | 31 | 36 | 4 | Last LSN |
| | SA size | 31 | 40 | 12 | SA size |

FIG. 21B

| | | | | |
|---|---|---|---|---|
| Spare Area Full flags | 31 | 52 | 1 | 0?h |
| Reserved and set to 00h | 31 | 53 | 3 | 00h |
| Pre-write Area flags | 31 | 56 | 1 | |
| Reserved and set to 00h | 31 | 57 | 7 | 00h |
| Status bits of PAC locations | 31 | 64 | 32 | - |
| Reserved and set to 00h | 31 | 96 | 928 | |
| Recording Mode | 31 | 1024 | 1 | 000000?0b |
| General flag bits | 31 | 1025 | 1 | 00h |
| Inconsistency flags | 31 | 1026 | 2 | 00h (TBD) |
| Reserved and set to 00h | 31 | 1028 | 4 | |
| Last Recorded Address of User Data Area | 31 | 1032 | 4 | LRA- |
| Reserved and set to 00h | 31 | 1036 | 4 | |
| TDMA sizes in SAs | 31 | 1040 | 12 | |
| Reserved and set to 00h | 31 | 1052 | 36 | |
| Next available PSNs of Test Zone. | 31 | 1088 | 8 | P_TZ |

FIG. 21C

| | | | | |
|---|---|---|---|---|
| Reserved and set to 00h | 31 | 1096 | 8 | |
| Next available PSNs of DCZ. | 31 | 1104 | 8 | P_CZ |
| Reserved and set to 00h | 31 | 1112 | 8 | |
| First PSN of nth Cluster of Defect List | 31 | 1120 | 8*4 | P_nth DFL |
| Reserved and set to 00h | 31 | 1152 | 32 | |
| First PSNs of SRRI/SBM | 31 | 1184 | 8 | P_SRRI/P_SBM |
| Reserved and set to 00h | 31 | 1192 | 24 | |
| Next available PSNs of SA | 31 | 1216 | 16 | P_SAs |
| Reserved and set to 00h | 31 | 1232 | 684 | |
| Year/Month/Date of recording | 31 | 1916 | 4 | |
| Drive ID: Manufacturer Name/ Additional ID/Unique Serial Number | 31 | 1920 | 128 | |
| Integrity of TDDS | NA | NA | NA | - |

RBP: Relative byte position from start byte of each DDS and DFL

FIG. 22

Checklist for TDFL verification

| Class | Items | Cl. nr /Data Frame | RBP | # of bytes | Expected value |
|---|---|---|---|---|---|
| DFL | DFL identifier | 0/0 | 0 | 2 | 444Ch |
| | DFL format | 0/0 | 2 | 1 | 00h |
| | reserved | 0/0 | 3 | 1 | 00h |
| | DFL Update Count | 0/0 | 4 | 4 | |
| | reserved | 0/0 | 8 | 4 | 00h |
| | number of DFL entries (N_DFL) | 0/0 | 12 | 4 | N_DFL |
| | number of RAD/CRD entries | 0/0 | 16 | 4 | N_RAD |
| | number of NRD entries | 0/0 | 20 | 4 | N_NRD |
| | reserved | 0/0 | 24 | 40 | 00h |
| | DFL entries | | 64 | 8*N_DFL | - |
| | DFL terminator | k/n | {N_DFL*8 + 64 − n*2048 − k*65536} | 8 b63-b32 | FFFFFFFFh |
| | | | | b31-b0 | |
| | reserved | k/n | {(N_DFL+1)*8 + 64 − n*2048 − k*65536} to 2047 | | 00h |
| | Integrity of DFL (Sorting order) | NA | NA | NA | - |

RBP: Relative byte position from start byte of each DDS and DFL

FIG. 23

Checklist for SRRI verification

| Class | Items | Cl. nr /Data Frame | RBP | # of bytes | Expected value |
|---|---|---|---|---|---|
| SRRI | SRRI identifier | 31-M | 0 | 2 | 5352h |
| | SRRI format | 31-M | 2 | 1 | 00h |
| | reserved | 31-M | 3 | 1 | 00h |
| | SRRI Update Count | 31-M | 4 | 4 | |
| | reserved | 31-M | 8 | 4 | 00h |
| | number of SRR entries (N_SRR) | 31-M | 12 | 4 | N_SRR |
| | number of Open SRRs | 31-M | 16 | 1 | Not more than 16 |
| | reserved | 31-M | 17 | 3 | |
| | List of Open SRR numbers | 31-M | 20 | 16*2 | |
| | Reserved | 31-M | 52 | 12 | 00h |
| | SRR entries | | 64 | 8*N_SRR | - |
| | SRR terminator | 30 | {N_SRRI*8 + 64 − (M−1)*2048} | 8 b63-b32 | FFFFFFFFh |
| | | | | b31-b0 | |
| | reserved | 30 | {(N_SRRI+1)*8 + 64 − (M−1)*2048} to 2047 | .. | 00h |
| | Integrity of SRRI (Sorting order) | NA | NA | NA | - |

RBP: Relative byte position from start byte of each DDS and DFL

FIG. 24A

Items for "Recording" test and "Modification" test

| Class | Item | Value (80mm: 7.8GB/L, 120mm: 23.3GB/L) | |
|---|---|---|---|
| TDMA Access Indicators | Location | SEE FIG. 18 | |
| | Marked status | Shall indicate TDMA which is currently in use | |
| | Error condition of indicator Cluster | No Uncorrectable error | |
| | Contents of indicator Cluster | Shall be TDDS | |
| | Unused area | Shall be unrecorded | |
| | Integrity | | |
| The latest TDDS | TDDS identifier | 4453h | |
| | TDDS Update Count | N- | |
| | First PSN of Drive Area | P_DA | |
| | First PSN of Defect List | 00h | |
| | Location of LSN 0 of User Data Area | 00 12 00 00h | |
| | Last LSN of User Data Area | Last LSN | |
| | Inner Spare Area 0 size | 00 00 10 00h | |
| | Outer Spare Area 1 size | OSA_size | |
| | Inner Spare Area 1 size | ISA1_size | |
| | Spare Area Full flags | SL | 000000??b |
| | | DL | 0000????b |
| | Recording Mode | 000000?0b | |
| | General flag bits | 00000000b | |
| | Inconsistency flags | 00h | |
| | LRA of User Data | Real LRA | |
| | TDMA sizes in SAs | - | |

FIG. 24B

| | | |
|---|---|---|
| | DFL pointers | - |
| | SRRI pointer | - |
| | Next available PSNs of SAs | - |
| | Integrity of TDDS | - |
| The latest TDFL | DFL identifier | 444Ch |
| | DFL Update Count | -N |
| | number of DFL entries | N_DFL |
| | number of RAD/CRD entries | - |
| | number of NRD entries | - |
| | Integrity of DFL entries | |
| | DFL terminator | b63-b32 FFFFFFFFh |
| | | b31-b0   -N |
| | Blank area | 00h |
| | Integrity of DFL | Sorting order |
| | | N_DFL, N_RAD/CRD, N_NRD |
| The latest SRRI | SRRI identifier | 5352h |
| | SRRI format | 00h |
| | SRRI Update Count | -N |
| | N_SRR | - |
| | number of Open SRRs | Not more than 16 |
| | List of Open SRR numbers | - |
| | Integrity of SRR entries | |
| | SRR terminator | b63-b32 FFFFFFFFh |
| | | b31-b0   -N |
| | Integrity of SRRI | Sorting order |

FIG. 25
Items for "Disc Closing" test

| Class | Item | Value (80mm: 7.8GB/L, 120mm: 23.3GB/L) |
|---|---|---|
| TDMA Access Indicators | Location | SEE FIG. 18 |
| | Marked status | Shall indicate DMA |
| | Error condition of indicator Cluster | No Uncorrectable error |
| | Contents of indicator Cluster | Shall be TDDS in DMA1 |
| | Unused area | - |
| DDS | Same as the latest TDDS | Same as the latest TDDS except "First PSN of DFL" field |
| DFL | Same as the latest TDFL | Same as the latest TDFL |
| SRRI | Same as the latest SRRI | Same as the latest SRRI |

FIG. 26
Items for "Reading" test

| Class | Item | Value (80mm: 7.8GB/L, 120mm: 23.3GB/L) |
|---|---|---|
| Disc Contents | Conformance of contents in User Data Area | Same as reference data mirror file |
| The latest TDFL | Correct reading of the latest TDFL | - |

VERIFICATION METHOD AND APPARATUS

CROSS-REFERENCE TO RELATED APPLICATIONS

This application claims the benefit of Korean Patent Application No. 2006-60687 filed on Jun. 30, 2006, in the Korean Intellectual Property Office, the disclosure of which is incorporated herein in by reference in its entirety.

BACKGROUND OF THE INVENTION

1. Field of the Invention

An aspect of the invention relates to the recording and/or reproducing of a disc, and more particularly to a method of verifying whether a recording and/or reproducing apparatus properly processes temporary disc management area information generated by recording and/or reproducing data, and an apparatus for performing the method. The term "recording and/or reproducing apparatus" refers to an apparatus that record, or an apparatus that can reproduce, or an apparatus that can both record and reproduce.

2. Description of the Related Art

Blu-ray disc recordable (BD-R) discs have a recording function capable of replacing a disc defect with a normal recording area, which is referred to as defect management. Also, user data areas of BD-R discs are divided into a plurality of sequential recording ranges (SRRs) so that each SRR can perform incremental recording, which is referred to as a sequential recording mode (SRM). By a write command from a host PC for a previously recorded area, replacement data for replacing data in a recorded area can be recorded in an unrecorded area, which is referred to as logical overwrite (LOW).

A temporary disc management area (TDMA) stores information necessary for the general use and management of BD-R discs. The TDMA is allocated in a lead-in zone on a BD-R disc and additionally in a part of a spare area of a user data area so that a plurality of TDMAs are allocated on the BD-R disc and are sequentially used.

TDMA information includes a temporary disc definition structure (TDDS), a temporary defect list (TDFL), sequential recording range information (SRRI), etc. The BD-R disc additionally requires TDMA access indicators to easily and quickly find out location information of a location where a final TDMA is recorded since a plurality of TDMA areas are allocated on the BD-R disc.

The TDMA access indicators are recorded in the first few clusters of the TDMA allocated in the lead-in zone and include the TDDS in order to be informed of physical location information of the TDMAs allocated to the BD-R disc from the TDDS. The TDDS includes size and location information of the spare area allocated to the BD-R disc and location information of locations where the SRRI and the TDFL are recorded. The TDFL includes information about a defect found when the BD-R disc is used, information to be replaced with the information about the defect, and replacement information by the LOW. The SRRI includes information about each of the SRRs according to sequential recording.

Since the TDMA information is closely related to a physical recording location of data, a recording and/or reproducing apparatus can use a BD-R disc on which the TDMA information produced or changed by another recording and/or reproducing apparatus is recorded. When a BD-R disc has a problem in terms of compatibility between recording and/or reproducing apparatuses, an error occurs in the TDMA information. If the TDMA access indicators, which are used to easily and quickly find out location information of a location where the final TDMA is recorded, are not properly produced, a compatibility problem between recording and/or reproducing apparatuses occurs. To address this problem, a method of and an apparatus for verifying whether a recording and/or reproducing apparatus exactly analyzes TDMA information and TDMA access indicators from BD-R discs and correctly records the TDMA information and the TDMA access indicators on BD-R discs are required.

SUMMARY OF THE INVENTION

An aspect of the invention provides a method of and an apparatus for verifying whether a recording and/or reproducing apparatus properly produces disc management information and records the disc management information on a disc.

According to an aspect of the invention, there is provided a method of verifying whether a recording and/or reproducing apparatus that records and/or reproduces a disc including temporary defect management area (TDMA) information properly produces the TDMA information, the method including producing as test information TDMA information produced by performing a recording test according to a series of recording operations based on a test scenario using a blank test disc; and providing a result of the recording test by confirming the test information using reference test information for the recording test.

According to another aspect of the invention, there is provided a verifier that confirms whether a recording and/or reproducing apparatus that records and/or reproduces a disc including TDMA information properly produces the TDMA information, the verifier including a recording module that issues a series of commands to perform a recording test according to a series of recording operations based on a test scenario using a blank test disc; wherein the verifier receives as test information TDMA information produced from a test disc produced after performing the recording test, confirms the received test information based on reference test information, and provides a result of the recording test.

According to another aspect of the invention, there is provided a method of verifying whether a drive that records a disc including temporary defect management area (TDMA) information properly records the TDMA information, the method including recording predetermined data on a blank test disc with a drive to be tested according to a predetermined test scenario to generate a disc to be verified having TDMA information recorded thereon; generating test information from the TDMA information recorded on the disc to be verified; and verifying whether the TDMA information was properly recorded on the disc to be verified by the drive to be tested based on the test information.

According to another aspect of the invention, there is provided a verifier that verifies whether a drive that records a disc including temporary defect management area (TDMA) information properly records the TDMA information, the verifier including a recording module that controls a drive to be tested to record predetermined data on a blank test disc according to a predetermined test scenario to generate a disc to be verified having TDMA information recorded thereon; wherein the verifier receives test information generated from the TDMA information recorded on the disc to be verified, and verifies whether the TDMA information was properly recorded on the disc to be verified by the drive to be tested based on the test information.

Additional aspects and/or advantages of the invention will be set forth in part in the description which follows, and, in part, will be obvious from the description, or may be learned by practice of the invention.

BRIEF DESCRIPTION OF THE DRAWINGS

The above and/or other aspects and advantages of the invention will become apparent from the following description of embodiments of the invention, taken in conjunction with the accompanying drawings of which:

FIG. 7 is a table of a structure of a TDMA access indicators mirror file according to an aspect of the invention;

FIG. 8 is a table of a structure of a DMA mirror file according to an aspect of the invention;

FIGS. 9A and 9B are tables of locations of defective clusters on a TD-S00 (TD-D00) disc having a thickness of 120 mm according to an aspect of the invention;

FIGS. 9C and 9D are tables of locations of defective clusters on a TD-S00 (TD-D00) disc having a thickness of 80 mm according to an aspect of the invention;

FIG. 10 is a table of a structure of a TDMA image file according to an aspect of the invention;

FIG. 11 is a table of a structure of a TDMA access indicators image file according to an aspect of the invention;

FIG. 12 is a table of a structure of a disc image file according to an aspect of the invention;

FIG. 14 is a table of test modes and test conditions for each test mode according to an aspect of the invention;

FIG. 15 is a table of test processes versus test discs and checking items according to an aspect of the invention;

FIG. 18 is a table of a checklist for TDMA access indicators verification according to an aspect of the invention;

FIG. 19 is a table of a checklist for TDMA verification according to an aspect of the invention;

FIG. 20 is a table of a checklist for DMA verification according to an aspect of the invention;

FIGS. 21A through 21C are tables of a checklist for temporary disc definition structure (TDDS) verification according to an aspect of the invention;

FIG. 22 is a table of a checklist for temporary defect list (TDFL) verification according to an aspect of the invention;

FIG. 23 is a table of a checklist for sequential recording range information (SRRI) verification according to an aspect of the invention;

FIGS. 24A and 24B are tables of contents of test items for a "Recording" test and a "Modification" test according to an aspect of the invention;

FIG. 25 is a table of contents of test items for a "Disc Closing" test according to an aspect of the invention; and FIG. 26 is a table of contents of test items for a "Reading" test according to an aspect of the invention.

DETAILED DESCRIPTION OF THE EMBODIMENTS

Figure 1:
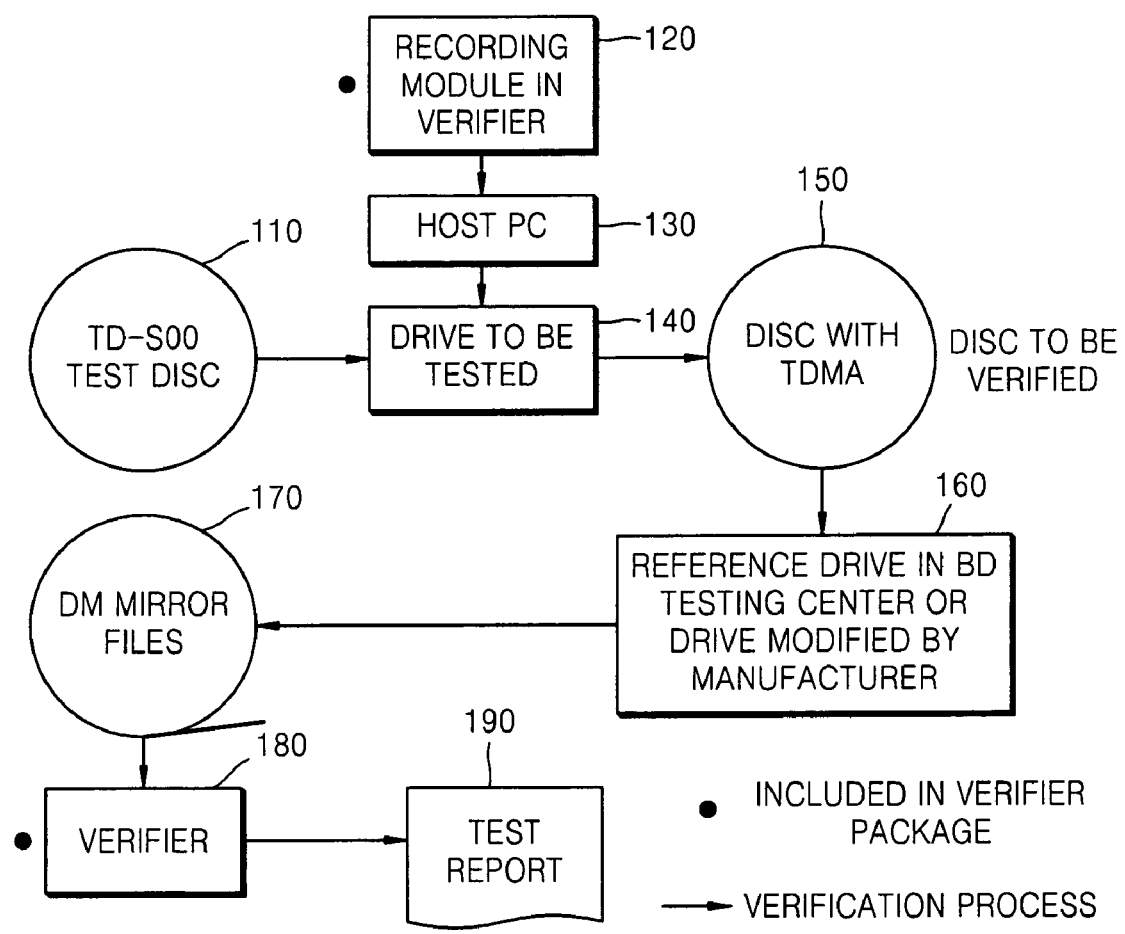
FIG. 1 is a diagram of a recording test system according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

The drive which is to be tested is verified by the verifier whose main function is to scan and analyze mirror files in order to decide the validity of the mirror files, which thereby reflects the validity of the drive to be tested. Mirror files are generated from discs by using a reference drive in a Blu-ray disc (BD) Testing Center or a drive modified by its manufacturer to have the capability of generating mirror files from discs.

A "Recording Operation" test covers the whole recording procedure from initializing a blank disc to closing the disc. The test consists of two separate but sequential sub-tests, a "Recording" test and a "Disc Closing" test. That is, the "Disc Closing" test can be done only with a disc which has successfully passed the preceding "Recording" test.

The "Recording" test starts with initialization of a blank disc, and then performs pre-determined recording operations on the disc. A temporary disc management area (TDMA) structure created on the disc is verified in the form of a mirror file. The "Disc Closing" test verifies a DMA structure after closing the disc based on the TDMA structure before closing the disc.

A "Reading & Modification" test uses a disc pre-recorded with specified data in order to test compatibility of drives by reading contents and modifying data on the disc. The test consists of two sub-tests, a "Reading" test and a "Modification" test. These tests require a preparation step in which a common test disc form is made. The "Reading" test is a simple 1:1 data conformance check based on temporary defect list (TDFL) entries between a reference data mirror file and a data mirror file, which has to be verified. The "Modification" test is to check if the TDMA structure is updated properly after modification of data on the disc.

FIG. 1 is a diagram of a recording test system according to an aspect of the invention. Referring to FIG. 1, in a "Recording" test, a TD-S00 (TD-D00) test disc 110, which is a blank disc, is used as an input to the drive 140, which is to be tested. When the TD-S00 (TD-D00) test disc 110 provided by the BD Test Center is loaded into the drive 140, the drive 140 performs a mode specific "Recording" test on the disc 110 according to a selected recording mode. The test starts with initializing, that is, formatting, the disc. The detailed formatting process depends on the type of test scenario. Each test scenario has a different setting and sequence of operations. Then, the drive 140 performs specified recording operations to record predetermined data on the TD-S00 (TD-D00) test disc 110, thereby generating a disc 150 with a TDMA as a result. The instructions to perform these recording operations are issued by a recording module 120 in a verifier, which is specially designed to issue drive-level WRITE instructions directly to the drive 140, thereby bypassing a host PC 130.

Using this disc 150 with the TDMA, DM mirror files, which are a TDMA mirror file and a TDMA access indicators mirror file 170, are generated by a drive 160 which is a reference drive in a BD Test Center or a drive modified by its manufacturer to have the capability of generating the DM mirror files. These mirror files conform to a specified file format of the DM mirror files. The final step is verification of these DM mirror files and preparation of a test report 190, based on the specification and detailed check items of the selected test scenario (or mode) undergoing the "Recording test." The verification is performed by comparing the DM mirror files generated from the disc 150 with the TDMA with reference DM mirror files generated from reference TDMA information that is expected to be recorded on the TD-S00 (TD-D00) test disc 110 when the predetermined data is recorded on the TD-S00 (TD-D00) test disc 110.

With regard to the write mode, since it is impossible to change data without a DM, the DM-off mode is not allowed but the DM-on and LOW-on mode and the DM-on and LOW-off mode are allowed. The DM-on and LOW-on mode refers to a write mode in which a linear replacement of the DM is enabled and LOW is enabled. The DM-on and LOW-off mode refers to a write mode in which the linear replacement of the DM is enabled and LOW is not enabled.

Figure 2:
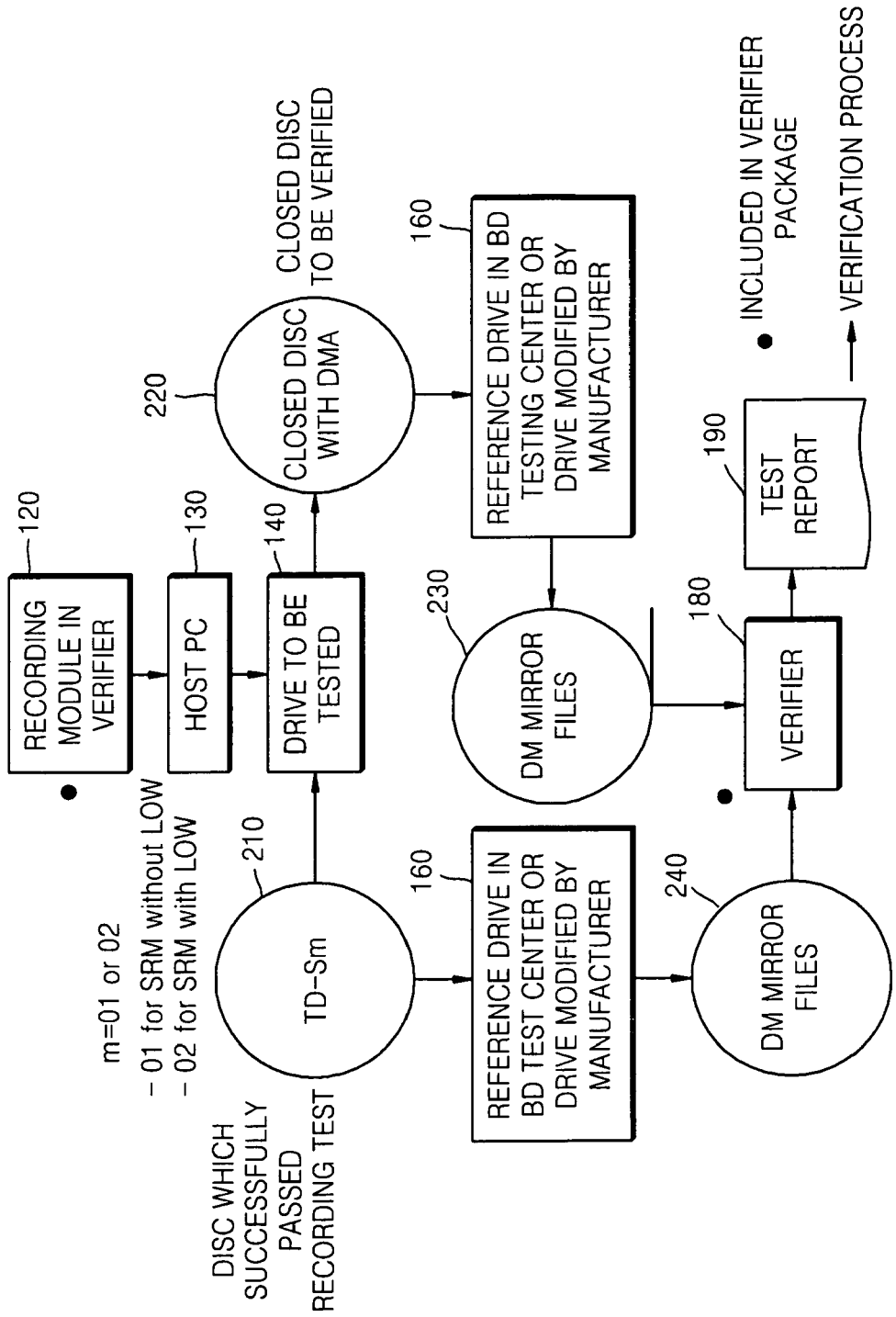
FIG. 2 is a diagram of a disc closing test system according to an aspect of the invention.

FIG. 2 is a diagram of a disc closing test system according to an aspect of the invention. Referring to FIG. 2, in the "Disc Closing" test, the TD-Sm (TD-Dm) (m=01 for sequential recording mode (SRM) without LOW, m=02 for SRM with LOW) Test Disc 210, which successfully passed the preceding "Recording" test, is used as an input to the drive 140, which is to be tested. Therefore, the test is possible only after the "Recording" test has succeeded at least once and produced disc with TDMA as output.

In order for the verifier 180 to check a DMA structure based on a TDMA structure, two steps for mirror files are required.

First, the disc with the TDMA is directly loaded into a drive 160 which is a reference drive in a BD Testing Center or a drive modified by its manufacturer. As a result, DM mirror files 240, which are a TDMA mirror file and a TDMA access indicators mirror file, are extracted from the disc with the TDMA.

Secondly, when the disc with TDMA is loaded into the drive 140 to be tested, the drive performs the disc closing operation. The disc is closed, and the DMA structure is written to the disc. Using this closed disc 220 with the DMA, DM mirror files 230, which are a DMA mirror file and a TDMA access indicators mirror file, are generated by the drive 160 which is the reference drive in the BD Test Center or the drive modified by its manufacturer. These mirror files conform to a specified file format of the DM mirror file. The final step is verification of the DM mirror files 230, based on the specification, pre-extracted DM mirror files 240, and the "Disc Closing" test.

Figure 3:
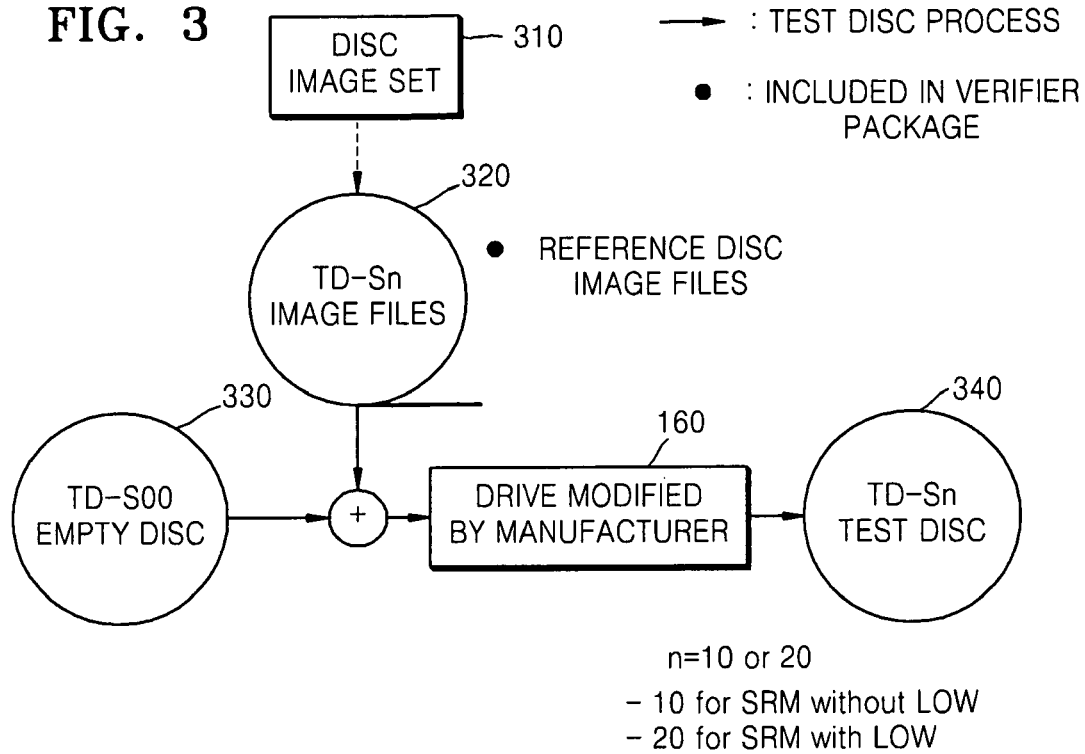
FIG. 3 is a diagram of a test disc preparation system according to an aspect of the invention.

FIG. 3 is a diagram of a test disc preparation system according to an aspect of the invention. Referring to FIG. 3, before executing a "Reading & Modification" test, a preparation step for making a test disc that will be used in the "Reading & Modification" test is performed. With a disc image set 310 provided with a verifier package, testers make a TD-Sn (TD-Dn) (n=10 for SRM without LOW, n=20 for SRM with LOW) test disc 340 by recording the contents 320 of image files to a TD-S00 (TD-D00) test disc 330 (a blank disc). In order to make the test disc, a drive 160 which is a drive modified by its manufacturer to extract DM structures as mirror files, is used. It is assumed that since the drive 160 can read a disc and extract DM structures as mirror files, the reverse process (making a disc with the disc image set) is also possible with the drive 160.

Figure 4:
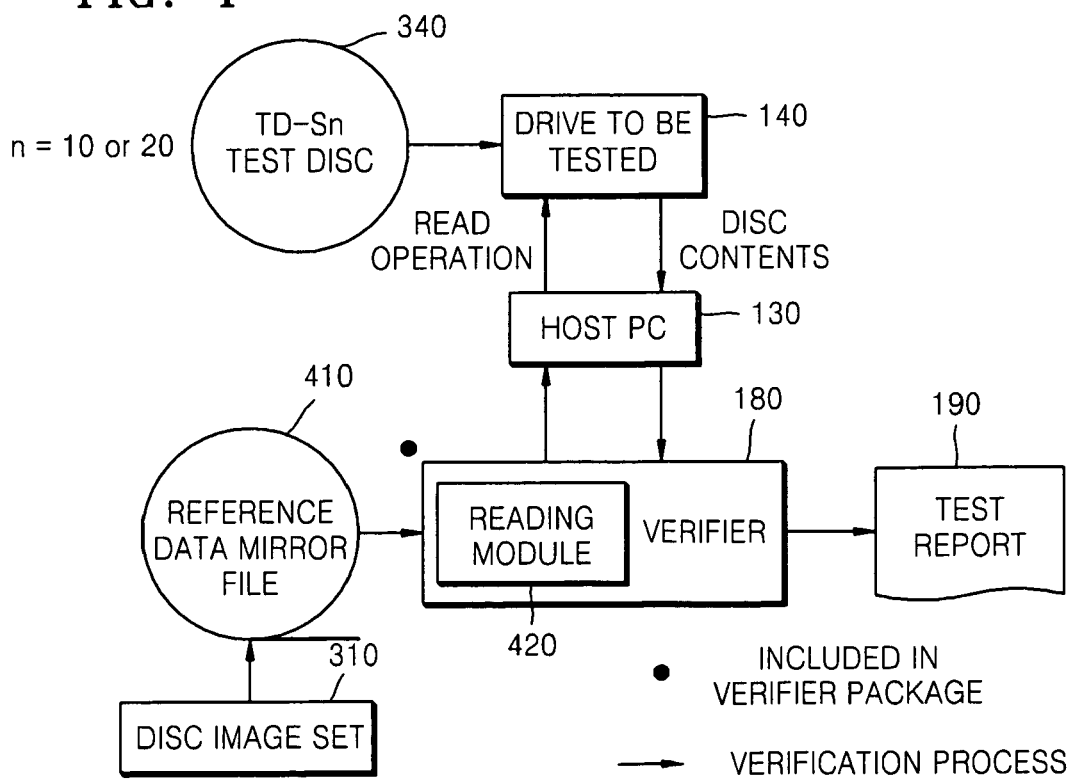
FIG. 4 is a diagram of a reading test system according to an aspect of the invention.

FIG. 4 is a diagram of a reading test system according to an aspect of the invention. Referring to FIG. 4, the "Reading" test is performed in order to see that the drive to be tested can read properly from a disc. For this purpose, the reading module 420 in a verifier 180, which is specially designed to issue drive-level READ instructions directly to the drive 140, thereby bypassing a file system layer, is used. In the "Reading Test," a TD-S10 test disc and a TD-S20 test disc 340 is used. When the test disc is loaded into the drive 140, which is to be tested, the reading module 420 in the verifier will send READ instructions to the drive 140 via a host PC 130. Then, the verifier will compare disc contents read from the disc and the reference data mirror file 410 related to the disc image set 310. They match exactly except for some implementation-dependent factors.

Figures 5, 6:
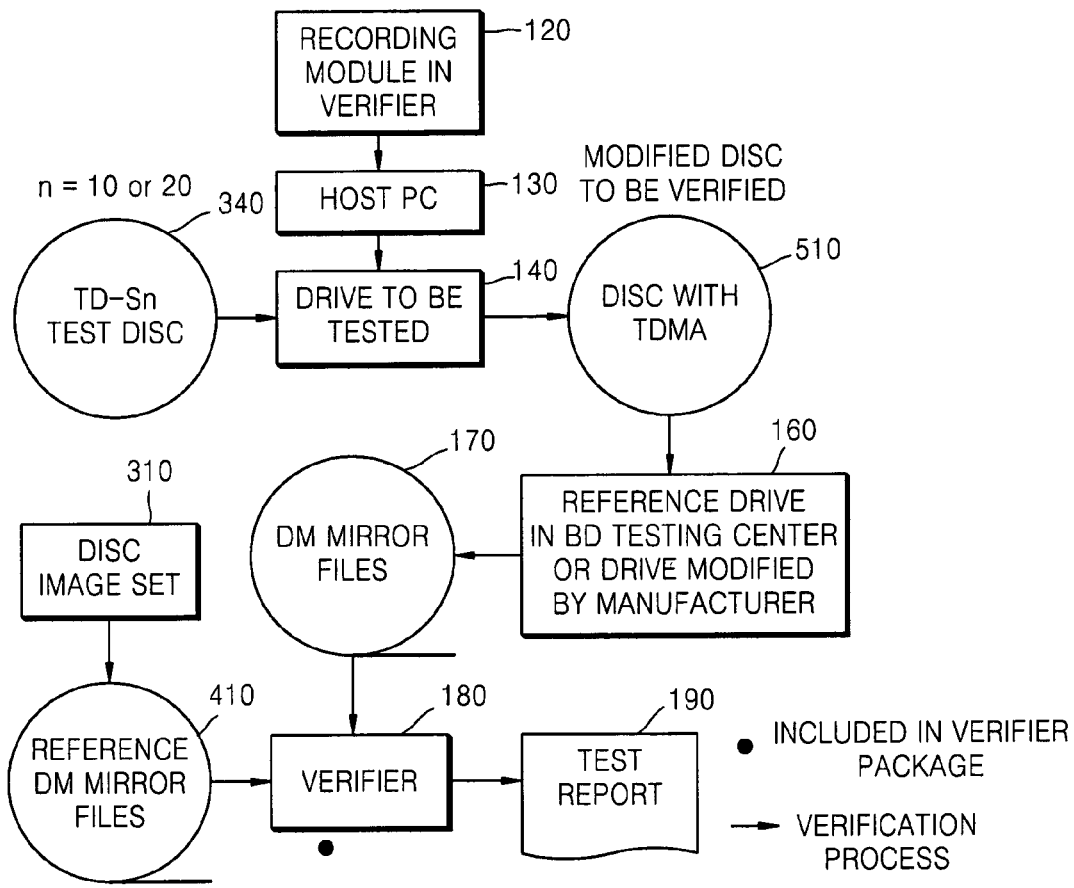
FIG. 5 is a diagram of a modification test system according to an aspect of the invention.
FIG. 6 is a table of a structure of a temporary disc management area (TDMA) mirror file according to an aspect of the invention.

FIG. 5 is a diagram of a modification test system according to an aspect of the invention. Referring to FIG. 5, in a "Modification" test, a TD-S10 (TD-D10) test disc and a TD-S20 (TD-D20) test disc 340 made in the preparation step are used as input discs. The goal of the "Modification" test is to verify that the TDMA structure is updated properly according as data on the disc is added and modified. When the TD-Sn (TD-Dn) (n=10 for SRM without LOW, n=20 for SRM with LOW) test disc 340, which can be made only by using a modified drive with a TD-S00 (TD-D00) test disc, a TD-Sn (TD-Dn) reference mirror file, and a TD-Sn (TD-Dn) disc image file, is loaded into the drive 140 to be tested, the drive 140 adds and modifies data following a pre-determined scenario by a WRITE AND VERIFY (10) command. The instructions to perform these operations are issued by recording module 120 in the verifier, which is specially designed to issue drive-level instructions directly to the drive 140, thereby bypassing a file system layer. As a result, the disc 510 with a modified TDMA will be generated. Using this disc 510 with the TDMA, DM mirror files 170, which are a TDMA mirror file and a TDMA access indicators mirror file, are generated by the drive 160 which is the reference drive in the BD Test Center or by the drive modified by its manufacturer. These mirror files conform to a specified file format of the DM mirror file. The final step is verification of the DM mirror files 170 with reference DM mirror files 410, based on the specification and detailed check items of the selected test scenario (or mode) undergoing the "Reading & Modification" test.

Note that in this case a DM-off mode is not allowed because modification of data is impossible without a DM, and only a DM-on and LOW-on mode or a DM-on and LOW-off mode is allowed. The DM-on and LOW-on mode refers to a Recording Mode in which linear replacement of defect management is enabled and LOW is enabled, and a DM-on and LOW-off mode refers to a Recording Mode in which linear replacement of defect management is enabled and LOW is not enabled.

A disc management (DM) mirror file will now be described in detail.

There are three kinds of mirror files; a TDMA mirror file, a TDMA access indicators mirror file, and a DMA mirror file. These files are generated from a disc in order to be verified by a reference drive in a BD Testing Center or by a drive modified by its manufacturer, and are verified in order to verify the drive.

The file format of a TDMA mirror file will now be described with reference to FIG. 6.

The size of a TDMA mirror file is exactly 5*64*1024 bytes (320 KB) for an SL disc and 9*64*1024 bytes (576 KB) for a DL disc. The structure of the TDMA mirror file is shown in FIG. 6. A file name can be chosen without any restrictions and the file extension is "tdma." All contents of the file are written as binary code.

For the purpose of verification, the size of sequential recording range information (SRRI) is fixed by 31 data frames (62 KB) and the size of a TDFL in a TDMA mirror file is fixed by 4 clusters on an SL disc and 8 clusters on a DL disc, respectively.

The file format of a TDMA access indicators mirror file will now be described with reference to FIG. 7.

The size of the TDMA access indicators mirror file is exactly 3*64*1024 bytes (192 KB) for an SL disc and 6*64*1024 bytes (384 KB) for a DL disc. The structure of the TDMA access indicators mirror file is shown in FIG. 7. A file name can be chosen without any restrictions and the file extension is "adma." All contents of the file are written as binary code. Every cluster which is unrecorded on the disc is set to 00h.

The file format of a DMA mirror file will now be described with reference to FIG. 8.

The size of the DMA mirror file is exactly 4*8*64*1024 bytes (2048 KB) for an SL disc and 4*12*64*1024 bytes (3072 KB) for a DL disc. The structure of the DMA mirror file is shown in FIG. 8. A file name can be chosen without any restrictions and the file extension is "dma." All contents of the file are written as binary code. Every cluster which is unrecorded on the disc is set to 00h.

A test disc used in the invention will now be described in detail.

There are five types of test disc for DM verification, TD-S00 (TD-D00), TD-S01 (TD-D01), TD-S02 (TD-D02), TD-S10 (TD-D10), and TD-S20 (TD-D20). If a DM verification process is required to be executed, it is necessary to prepare a special drive, which has direct read/write access to a (T)DMA. Also, a TD-S10 (TD-D10)-type test disc and a TD-S20 (TD-D20)-type test disc must be made on a modified drive with TD-S00 (TD-D00) test disc and a reference disc image set.

A TD-S00 disc will now be described in detail.

A TD-S00 (TD-D00) disc is a disc designed exclusively for DM verification, particularly for a "Recording Operation" test. The disc itself is provided by a BD Testing Center.

Test items for a TD-S00 (TD-D00) disc are a "Recording" test in a DM-on and LOW-off mode while a "Recording Operation" test is being performed, and a "Recording" test in a DM-on and LOW-on mode while a "Recording Operation" test is being performed.

A TD-S00 (TD-D00) disc is a blank disc with defects on known locations and may also have some other defects on it. The defect structure on the known locations is as follows.

A TD-S00 (TD-D00) disc of 120 mm (23.3 GB/L) includes 200 defective clusters per layer, and locations of the defective clusters are shown in FIGS. 9A and 9B.

A TD-S00 (TD-D00) of 80 mm (7.8 GB/L) includes 69 defective clusters on L0 and 64 defective clusters on L1, and locations of the defective clusters are shown in FIGS. 9C and 9D.

A TD-Sm (TD-Dm) disc will now be described in detail (m denotes 01 and 02).

The TD-Sm (TD-Dm) disc is a disc for DM verification, especially for a "Disc Closing" test performed by drive to be tested for DM verification. The disc itself is made by successfully passing the "Recording" test for each recording mode automatically. In order to execute a DM verification process, it is necessary to prepare a special drive, which has direct read access to a TDMA.

Test item for a TD-S01 (TD-D01) disc is a "Disc Closing" test in a DM-on and LOW-off mode undergoing a "Recording Operation" test. A test item for a TD-S02 (TD-D02) disc is a "Disc Closing" test in a DM-on and LOW-on mode under a "Recording Operation" test.

The TD-Sm (TD-Dm) disc contains temporary disc management structure (TDMS) update units in the TDMAs and data recorded on a data area of the disc. The recorded data is from a TD-S00 (TD-D00) disc, i.e., "Recording Test" data, which was recorded on it following one of the recording scenarios of a recording module in the verifier.

A TD-Sn (TD-Dn) disc will now be described in detail (n denotes 10 and 20).

The TD-Sn (TD-Dn) disc is a disc designed for DM verification, especially for a "Reading & Modification" test. The discs themselves are not provided by the BD Testing Center. Instead, a reference disc image set, which consists of a TDMA image file, a TDMA access indicators image file, and a data image file, will be provided with a DM verifier. In order to execute a DM verification process, it is necessary to prepare a special drive, which has direct read/write access to the TDMA. Also, a TD-Sn (TD-Dn)-type test disc must be made on a modified drive with a TD-S00 (TD-D00)-type test disc and a reference disc image set.

A disc image set consists of a TDMA image file, a TDMA access indicators image file, a data image file, and PSNs for the physical locations on which the data image file will be recorded. A TDMA image file is for pre-fixed TDMS update units in TDMA(s), a TDMA access indicators image file is for a TDMA access indicators clusters, and a disc image file is for data to be recorded on a data area of a disc. From these files, a disc identical with the original reference disc is created. Disc image sets are included in a DM verifier package. The TDMA access indicators image file can exist only if the size of the TDMA image file is bigger than the size of TDMA0. The contents of image files and the PSNs in a disc image set are used to verify a drive to be tested based on detailed checking items according to a "Reading & Modification" test.

A file format of a TDMA image file will now be described with reference to FIG. 10.

The TDMA image file may have any size as long as it complies with test purposes, except that the size must comply with M*64 KB (where M is a positive integer). The structure of the TDMA image file is shown in FIG. 10. A file name can be chosen without any restrictions and the file extension is "timg." All contents of the file are written as binary code.

The first 64 KB of the TDMA image file are filled up with the first TDMS update unit, which is a TDMS created by formatting a process for an SRM with all update count fields set to 0, and the rest of the TDMA image file is filled up with TDMS update units which consist of all the other TDMS update units from the second TDMS update unit to the latest TDMS update unit. The last 2 KB of the latest TDMS update unit always contains the latest TDDS, which contains the latest SRRI pointer, the latest TDFL pointer, and so on.

To make a TD-Sn (TD-Dn) disc for the "Reading & Modification" test, a TDMA image file is recorded starting from the first cluster of TDMA0 except indicator clusters, in an ascending order of PSN.

A file format of a TDMA access indicators image file will now be described with reference to FIG. 11.

The size of the TDMA access indicators image file is variable up to 2*64 KB for an SL disc and 5*64 KB for a DL disc and it depends on the size of the TDMA image file and the allocated status of the TDMA formatting process. In other words, the size of the TDMA access indicators image file is n*64 KB (where n is the number of TDMAs in which the latest TDMS update unit in the TDMA image file will be recorded). The structure of the TDMA access indicators image file is shown in FIG. 11. A file name can be chosen without any restrictions while the file extension is "aimg." All contents of the file are written as binary code. Referring to FIG. 11, all 32 data frames in the indicator clusters contain a copy of the first TDDS recorded in the TDMA related to the actual indicator cluster. To make a TD-Sn (TD-Dn) disc for the "Reading & Modification" test, a TDMA access indicators image file is recorded starting from the TDMn indicator cluster in an ascending order of PSN, if the file exists in the disc image set.

A file format of a disc image file will now be described with reference to FIG. 12.

The disc image file may have any size as long as it complies with test purposes, except that the size must comply with N*64 KB (where N is a positive integer). The structure of the disc image file is shown in FIG. 12. A file name can be chosen without any restrictions and the file extension is "dimg." All contents of the file are written as binary code.

The first 4 bytes of each data frame (2 KB) of each cluster (64 KB) in the disc image file is filled up with the PSN of a corresponding data frame of the physical cluster on which the cluster is to be recorded, and the rest of the data frame is filled with 00h. This data recording is only for test purposes, in order to see if the drive can read and write data on a disc properly.

To make the TD-Sn (TD-Dn) disc for a "Reading & Modification" test, a disc image file is recorded on the physical cluster defined by PSNs, which are included in a disc image set containing the disc image file.

Test items for the TD-S10 (TD-D10) disc are a "Reading" test in DM-on and LOW-off mode under "Reading & Modification" test, and a "Modification" test in DM-on and LOW-off mode under "Reading & Modification" test. Test items for the TD-S20 (TD-D20) disc are a "Reading" test in DM-on and LOW-on mode under "Reading & Modification" test, and a "Modification" test in DM-on and LOW-on mode under "Reading & Modification" test.

The TD-S10 (TD-D10) disc contains pre-fixed TDMS update units in TDMAs and data recorded on a data area of the disc. This data is included in the reference disc image set for the TD-S10 (TD-D10) disc.

The TD-S20 (TD-D20) disc contains pre-fixed TDMS update units in the TDMA, the TDMA access indicator clusters, and data recorded on the data area of the disc. This data is included in the reference disc image set for the TD-S20 (TD-D20) disc.

Figure 13:
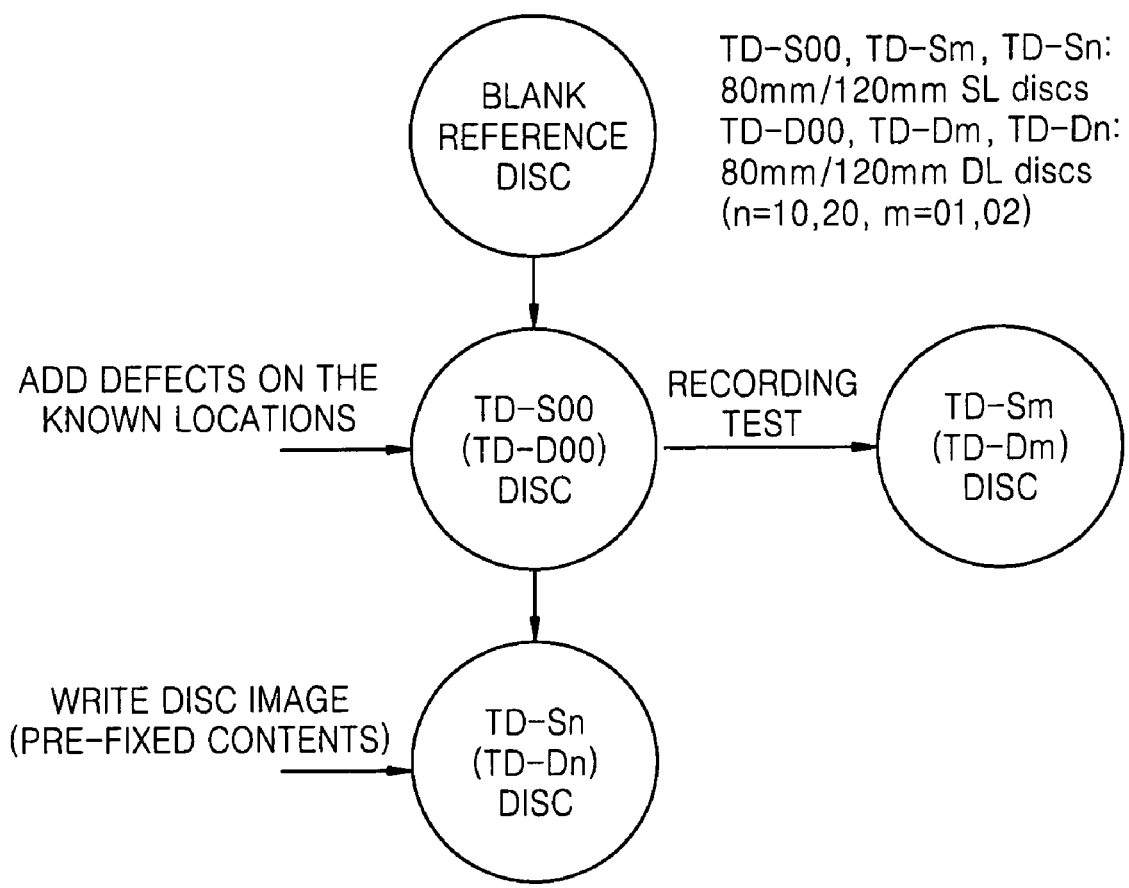
FIG. 13 is a diagram of a test disc status according to an aspect of the invention.

FIG. 13 is a diagram of a test disc status according to an aspect of the invention. Referring to FIG. 13, a TD-S00 disc has defects on known locations of a blank disc. The TD-S00 disc is provided by the BD Testing Center. This test disc is used for a "Recording Operation" test. The TD-S00 disc may also have some other defects thereon.

A TD-Sm (m denotes 01 and 02) disc is made by performing a recording test on the TD-S00 disc.

A TD-S01 disc is made from TD-S00 (D00) which successfully passed the preceding "Recording" test under DM-on and LOW-off mode. This test disc is used for a "Disc Closing" test under a DM-on and LOW-off mode. This test disc is recorded on the data area based on a recording scenario according to the DM-on and DM-off mode of a recording module in a verifier, the contents of the TDMA compliant with the recorded data on the data area, and TDMA access indicators depending on the contents of the TDMA.

A TD-S02 disc is made from TD-S00(D00) which successfully passed the preceding "Recording" test under the DM-on and LOW-on mode. This test disc is used for a "Disc Closing" test under the DM-on and LOW-on mode. Data is recorded on the data area based on a recording scenario according to the DM-on and DM-on mode of a recording module in a verifier, the contents of the TDMA compliant with the recorded data on the data area, and TDMA access indicators depending on the contents of the TDMA. A TD-Sn (n denotes 10 and 20) is made by a disc image recorded on the TD-S00 disc.

A TD-S10 disc is made by end-users with the TD-S00 (TD-D00) disc and a disc image set. This test disc is used for "Reading & Modification" test under DM-on and LOW-off mode. A disc image of a disc image set is recorded on the TD-S10 disc according to the DM-on and LOW-off mode in a verifier.

A TD-S20 disc is made by end-users with the TD-S00 (TD-D00) disc and a disc image set. This test disc is used for a "Reading & Modification" test under the DM-on and LOW-on mode. A disc image of a disc image set is recorded on the TD-S20 disc according to the DM-on and LOW-on mode in the verifier.

The TD-S00 disc, the TD-Sm disc, and the TD-Sn disc are 80 mm/120 mm single layer discs. The TD-D00 disc, the TD-Dm disc, and the TD-Dn disc are 80 mm/120 mm dual layer discs.

FIG. 14 is a table of test modes and test conditions for each test mode according to an aspect of the invention. Referring to FIG. 14, test modes for a "Recording Operation" test and a "Reading & Modification" test in both a DM-on and LOW-off mode and a DM-on and LOW-on mode are provided. The "Recording Operation" test in each recording mode consists of a "Recording" test and a "Disc Closing" test. The "Reading & Modification" test in each recording mode consists of a "Reading" test and a "Modification" test.

A test process versus test disc and checking Items according to an aspect of the invention will now be described with reference to FIG. 15.

FIG. 15 is a table of test processes versus test discs and checking items according to an aspect of the invention. Referring to FIG. 15, a "Recording" test of a "Recording Operation" test in a DM-on and LOW-off mode checks whether a TDMA structure complies with the standard, whether TDMA access indicators comply with the standard, whether TDFL contains TDFL entries that were generated by known defects based on recording locations of a test scenario, and whether SRRI entries comply with a recorded status based on a recording scenario.

A "Disc Closing" test of the "Recording Operation" test in the DM-on and LOW-off mode checks whether a DMA structure complies with the standard, whether the TDMA access indicators comply with the standard, and whether DMS is identical to the latest TDMS.

A "Reading" test of a "Reading & Modification" test in the DM-on and LOW-off mode checks whether data conforms to the TDFL entries.

A "Modification" test of the "Reading & Modification" test in the DM-on and LOW-off mode checks whether a TDMA structure complies with the standard, whether the TDMA access indicators comply with the standard, whether the TDFL contains the TDFL entries that were generated by known defects based on recording locations of the test scenario, and whether SRRI entries comply with a recorded status based on the recording scenario.

A "Recording" test of a "Recording Operation" test in a DM-on and LOW-on mode checks whether a TDMA structure complies with the standard, whether TDMA access indicators comply with the standard, whether TDFL contains TDFL entries that were generated by known defects and/or LOW based on recording locations of a test scenario, and whether SRRI entries comply with a recorded status based on a recording scenario.

A "Disc Closing" test of the "Recording Operation" test in the DM-on and LOW-on mode checks whether a DMA structure complies with the standard, whether the TDMA access indicators comply with the standard, and whether a DMS is the same as the latest TDMS.

A "Reading" test of a "Reading & Modification" test in the DM-on and LOW-on mode checks whether data conforms to TDFL entries.

A "Modification" test of the "Reading & Modification" test in the DM-on and LOW-on mode checks whether a TDMA structure complies with the standard, whether the TDMA access indicators comply with the standard, whether the TDFL contains the TDFL entries that were generated by known defects and/or LOW based on recording locations of the test scenario, and whether SRRI entries comply with a recorded status based on the recording scenario.

Figure 16:
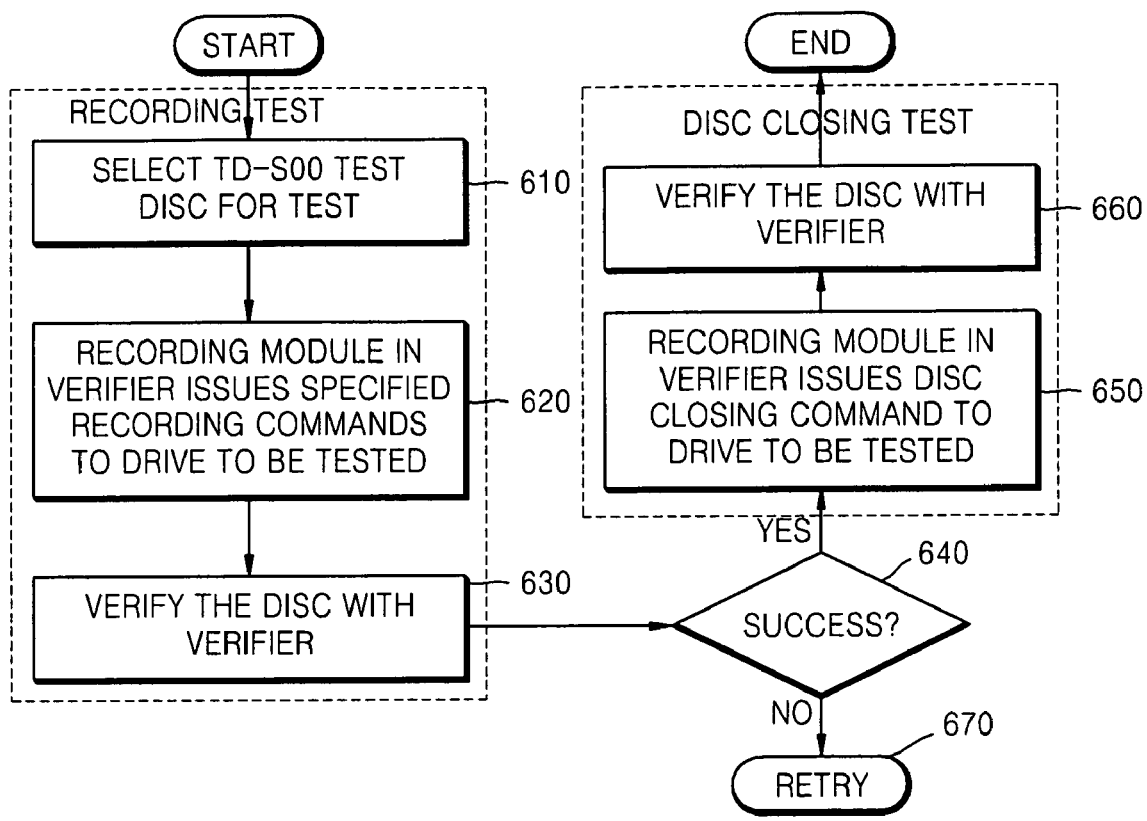
FIG. 16 is a flowchart of a method of verifying a "Recording Operation" test according to an aspect of the invention.

FIG. 16 is a flowchart of a method of verifying a "Recording Operation" test according to an aspect of the invention. Referring to FIG. 16, a "Recording" test will now be described.

A TD-S00 (TD-D00) test disc is used for a "Recording" test in both recording modes (SRM with LOW and SRM without LOW) (Operation 610).

For the "Recording" test in each recording mode, as the TD-S00 (TD-D00) test disc is loaded into the drive to be tested, the recording module in the verifier will issue specified recording commands based on a test scenario to the drive to be tested (Operation 620). In response to these specified recording commands, the drive to be tested formats the disc in a selected recording mode and records specified data on the disc during the recording mode. As a result, the drive to be tested generates a disc to be verified with a TDMA. Finally, the DM verifier verifies the disc to be verified with a TDMA by using DM mirror files (a TDMA mirror file and a TDMA access indicators mirror file), which are extracted from the disc by a reference drive in a BD Test Center or by a drive modified by its manufacturer (Operation 630).

A test scenario according to each recording mode is designed to verify the following items.

A replacement for known defects.

A replacement for LOW-on Open sequential recording range (SRR) entry (only in the case of an SRM with LOW).

A replacement for LOW-on Closed SRR entry (only in the case of an SRM with LOW).

SRR entries with status Open.

SRR entries with status Closed.

Multi-session recording (only in the case of an SRM without LOW).

Referring to FIG. 16, a "Disc Closing" test will now be described.

First, it is determined whether a TD-Sm (m denotes 01 and 02) test disc successfully passes the recording test (Operation 640). If the TD-Sm test disc does not successfully pass the recording test, the test is retried using a new disc (Operation 670). If the TD-Sm successfully passes the recording test, the TD-Sm test disc is used for a "Disc Closing" test.

For the "Disc Closing" test, a reference drive in a BD Test Center or a drive modified by its manufacturer extracts DM mirror files (a TDMA mirror file and a TDMA access indicators mirror file) from TD-Sm (TD-Dm). Then, with the TD-Sm(TD-Dm) test disc loaded into the drive to be tested, a recording module in a verifier issues commands for closing the disc (Operation 650). In response to these commands, the drive to be tested closes the disc. As a result, the drive to be tested generates a disc to be verified with a DMA.

Finally, a DM verifier verifies the disc to be verified with a DMA by using DM mirror files (a DMA mirror file and a TDMA access indicators mirror file), which are extracted from the disc by reference drive in a BD Test Center or by a drive modified by its manufacturer (Operation 660). A test scenario according to each recording mode is designed for the drive to be tested so as not to record some data on the user data area. In other words, the test scenario is only about closing the disc.

Figure 17:
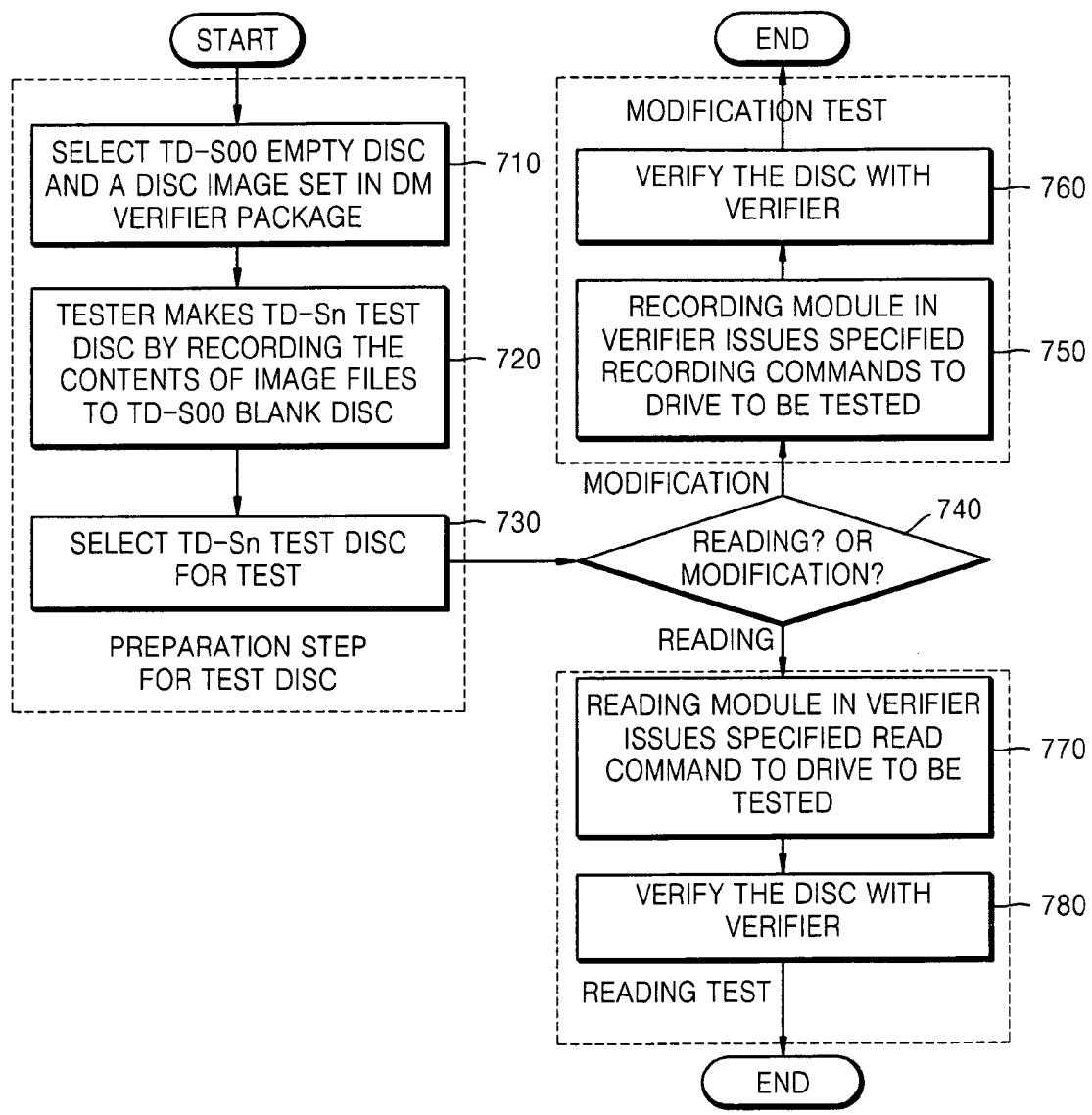
FIG. 17 is a flowchart of a method of verifying a "Reading & Modification" test according to an aspect of the invention.

FIG. 17 is a flowchart of a method of verifying a "Reading & Modification" test according to an aspect of the invention. Referring to FIG. 17, for a "Reading & Modification" test, testers make the TD-Sn (TD-Dn) test disc (Operation 720) using their own modified drive by selecting a TD-S00 (TD-D00) empty disc and a disc image set (Operation 710) which is designed for this test in each recording mode included in a DM verifier package and select a TD-Sn test disc for the "Reading & Modification" test (Operation 730). For verification purposes, a disc image set and a test scenario for this test is designed for a disc after a "Modification" test in order to have updated indicator clusters.

After the test disc has been prepared, either the "Reading" test or the "Modification" test is selected (Operation 740). If the "Reading" test is selected, the following operations are performed.

Referring to FIG. 17, the "Reading" test will now be described.

A TD-Sn test disc is used for the "Reading" test.

For the "Reading" test, as the TD-Sn (TD-Dn) test disc is loaded into the drive to be tested, a reading module in a verifier issues specified commands to read the contents of a user data area to the drive to be tested (Operation 770). In response to these specified commands, the drive to be tested reads the contents based on the latest TDFL and sends the contents from the disc to a DM verifier through a host PC. Finally, the DM verifier verifies the contents from the disc (Operation 780). Disc image sets for the "Reading" test are designed in order to verify data reading based on DFL entries created by defects and LOW. By comparing the reference data mirror file with data read from the test disc by the drive to be tested, the DM verifier may check indirectly if the drive to be tested read the latest TDMS correctly.

Referring to FIG. 17, the "Modification" test will now be described.

A TD-Sn test disc is used for a "Modification" test.

For the "Modification" test in each recording mode, as the TD-Sn (TD-Dn) test disc is loaded into the drive to be tested, the recording module in the verifier issues specified recording commands based on the test scenario to the drive to be tested (Operation 750). In response to these specified recording commands, the drive to be tested records specified data on the disc in the predetermined recording mode of the disc. As a result, the drive to be tested generates a disc to be verified with a TDMA. Finally, the DM verifier verifies the disc to be verified with the TDMA by using DM mirror files (a TDMA mirror file and a TDMA access indicators mirror file), which are extracted from the disc by the reference drive in the BD Test Center or by the drive modified by its manufacturer (Operation 760).

A test scenario according to each recording mode is designed to verify the following items.

A replacement for known defects.

A replacement for LOW-on Open SRR entry (only in the case of an SRM with LOW).

A replacement for LOW-on Closed SRR entry (only in the case of an SRM with LOW).

SRR entries with status Open.

SRR entries with status Closed.

Multi-session recording (only in the case of an SRM without LOW).

Whether a drive to be tested updates the TDMA access indicators.

Detailed checklists for disc management (DM) verification will now be described with reference to FIGS. 18 through 20, 21A through 21C, 22, 23, 24A and 24B, 25, and 26.

TDMA access indicators verification will now be described with reference to FIG. 18.

To quickly find out which TDMA is currently in use, the first clusters of TDMA0 are used as TDMA access indicators. Moreover, to quickly find out the location of a TDMA which is currently in use, each of the TDMA access indicator clusters contains the TDDS. For robustness, all 32 data frames in each of the TDMA access indicator clusters contain a copy of the TDDS as shown in FIG. 11.

FIG. 18 is a table of a checklist for TDMA access indicators verification according to an aspect of the invention. Referring to FIG. 18, the checklist for TDMA access indicators includes a location of the indicator clusters, a marked status of the indicator clusters, an error condition of the indicator clusters, contents of the indicator clusters, an unused area, and integrity of the indicator clusters.

Expected values of the location of the indicator clusters are SL: 00 0E E0 00h-00 0E E0 5Fh in a single layer and DL: 00 0E E0 00h-00 0E E0 BFh in a dual layer. If all the indicator clusters are unrecorded, then define is currently in use for the latest TDMS.

The marked status of the indicator clusters indicate a TDMA which is currently in use.

An expected value of the error condition of the indicator clusters is "no uncorrectable error." For verification purposes, in the case that one or more clusters are recorded, there are no uncorrectable errors in each indicator cluster. If an uncorrectable error is found, then the verification fails and the test is retried using a new disc.

The contents of the indicator clusters are 32 copies of the TDDS. All 32 data frames in each indicator cluster contain a copy of the TDDS if the cluster is recorded.

The unused area is unrecorded.

Concerning the integrity of the indicator clusters, the pointers for the TDFL and SRRI in the latest TDDS are in the TDMA which the indicator clusters indicate.

TDMA verification will now be described with reference to FIG. 19.

For the SL disc, the TDMA is located in the lead-in zone and called TDMA0. For the DL disc, there are two same TDMAs, TDMA0 in the lead-in Zone of layer 0 and TDMA1 in the lead-out zone of layer 1. Both TDMA0 and TDMA1 have a fixed size of 2048 physical clusters. The locations and sizes for additional TDMAs are dependent on the initialization status of a BD-R disc. The temporary disc management structure (TDMS) according to an aspect of the invention consists of a temporary disc definition structure (TDDS), a temporary defect list (TDFL), and sequential recording range information (SRRI). For verification purposes, an aspect of the invention verifies the latest TDMS, which most accurately reflects the current status of the disc. The latest TDMS is verified for a "Recording" test and a "Modification" test according to each recording mode.

FIG. 19 is a table of a checklist for TDMA verification according to an aspect of the invention. Referring to FIG. 19, the checklist for TDMA verification includes a location of TDMAs, a location of the latest TDDS, an error condition of the latest TDDS, an error condition of the latest TDFL, an error condition of the latest SRRI, additional TDMA_size fields in the latest TDDS, pointers for TDFL in the latest TDDS, and a pointer for SRRI in the latest TDDS.

In the location of the latest TDDS, the TDMAs are used sequentially in the following order. For an SL disc: TDMA0→TDMA1→TDMA2 (the size of TDMA1 and/or TDMA2 can be equal to 0); and for a DL disc: TDMA0→TDMA1→TDMA2→TDMA3→TDMA4→TDMA5 (the size of TDMA2 and/or the size of TDMA3 and TDMA4 and/or the size of TDMA5 can be equal to 0).

The expected value of the location of the latest TDDS is the last data frame of the last of the clusters constituting a TDMS. The latest TDFL and the latest SRRI are pointed to by the latest TDDS.

Concerning the error condition of the latest TDDS, for verification purposes, there are no uncorrectable errors in the cluster which contains the latest TDDS. If an uncorrectable error is found, then the verification fails and the test is retried using a new disc.

Concerning the error condition of the latest TDFL, for verification purposes, there are no uncorrectable errors in the clusters which contain the latest TDFL. If an uncorrectable error is found, then the verification fails and the test is retried using a new disc.

Concerning the error condition of the latest SRRI, for verification purposes, there are no uncorrectable errors in the clusters which contain the latest SRRI. If an uncorrectable error is found, then the verification fails and the test is retried using a new disc.

Additional TDMA_size fields in the latest TDDS are the same as those of the indicator clusters.

Concerning pointers for TDFL in the latest TDDS and a pointer for SRRI in the latest TDDS, the latest TDMS, which consists of the latest TDDS, the latest TDFL, and the latest SRRI, is in one TDMA.

DMA verification will now be described with reference to FIG. 20.

The DMA is verified for a "Disc Closing" test. By closing the disc, the latest TDMS except for a "First PSN of Defect List" field in the TDDS is copied into the DMAs 1, 2, 3, and 4 in order to describe the exact status of the disc at the moment of closing.

FIG. 20 is a table of a checklist for DMA verification according to an aspect of the invention. Referring to FIG. 20, the checklist for DMA verification includes the location of DMAs 1, 2, 3, and 4, an error condition of 16 DDS, DDS update count, contents of 4 DDS1 in DMA1, contents of 4 DDS2 in DMA2, contents of 4 DDS3 in DMA3, contents of 4 DDS4 in DMA4, an error condition of 4 DFL, DFL update count, and contents of 4 DFL.

Concerning the location of DMAs 1, 2, 3, and 4, all clusters of the first 4 clusters of each DMA contain DDS+SRRI.

Error condition of 16 DDS: for verification purposes, there are no uncorrectable errors in DDS. If an uncorrectable error is found, then the verification fails and the test is retried using a new disc.

DDS update count: all 16 DDS update counts have the same value for verification purposes.

Contents of 4 DDS1 in DMA1: all contents of 4 DDS1 are the same for verification purposes.

Contents of 4 DDS2 in DMA2: all contents of 4 DDS2 are the same for verification purposes.

Contents of 4 DDS3 in DMA3: all contents of 4 DDS3 are the same for verification purposes.

Contents of 4 DDS4 in DMA4: all contents of 4 DDS4 are the same for verification purposes.

That is, all contents in sixteen DDSs must be identical to each other for verification purposes except the first PSN field of a defect list of each DDS.

Error condition of 4 DFL: for verification purposes, there are no uncorrectable errors in the DFL. If an uncorrectable error is found, then the verification fails and the test is retried using a new disc.

DFL update count: all 4 DFL update counts have the same value for verification purposes.

Contents of 4 DFL: all contents of 4 DFL are the same for verification purposes.

TDDS and DDS verification will now be described with reference to FIGS. 21A through 21C.

The latest TDDS is verified for a "Recording" test and a "Modification" test according to each recording mode. The DDS is verified for a "Disc Closing" test. Contents of the DDS are the same as those of the latest TDDS except for a "First PSN of Defect List" field in the TDDS.

FIGS. 21A through 21C are tables of a checklist for TDDS verification according to an aspect of the invention. Referring to FIG. 21A through 21C, the checklist for TDDS verification includes the following items.

TDDS identifier.

TDDS format.

TDDS update count: $1 \leq N$ for a "Recording" test; $k+1 \leq N$ for a "Disc Closing" test and a "Modification" test (k: previous value).

First PSN of drive area: 0 or First PSN of a cluster within drive area(s); drive area on layer 0: 00 0F E4 00h~00 0F F3 FFh; drive area on layer 1: 01 F0 0C 00h~01 F0 1B FFh.

First PSN of defect list: this field is set to 00h in all TDDS sectors appearing in the TDMAs. When the disc is being closed and the final DDS is written in the DMA, this field specifies the first PSN of the first DFL that can be retrieved error-free in the DMA zone containing the particular DDS. If no defect list can be stored error-free, this field is set to FF FF FF FFh.

Location of LSN 0 of user data area: 00 10 00 00h+ 32*ISA0_size. For verification purposes, ISA0_size=4096.

Last LSN of user data area: for an SL disc: 32*(N_CL-ISA0_size-OSA_size)-1; for a DL disc: 32*(2*N_CL-ISA0_size-2*OSA_size-ISA1_size)-1.

SA size: bytes 40 to 43: ISA0_size=4096; bytes 44 to 47: OSA_size=N*256 ($0 \leq N \leq 64$ for SL disc and $0 \leq N \leq 32$ for DL disc); bytes 48 to 51: ISA0_size=K*256 (K=0 for SL disc and $0 \leq K \leq 64$ for DL disc).

Spare area full flags: b7 to b4: reserved; b3: Inner spare area 1 full flag; b2: Outer spare area 1 full flag; b1: Outer spare area 0 full flag; b0: Inner spare area 0 full flag; b3 to b0: for each bit, if the bit is set to 0, then spare clusters are available for replacement, and if the bit is set to 1, no spare clusters are available for replacement. On an SL disc, bits b3 and b2 are set to 0.

Pre-write Area flags: this field is not checked for verification purposes.

Status bits of PAC locations: this field is not checked for verification purposes.

Recording Mode: b2 to b7 are reserved areas when b1=0: LOW-off; b1=1: LOW-on; b0=0: SRM; and b0=1: RRM.

General flag bits: b1 to b7 are reserved areas when b0=0: Write protection off; b0=1: Write protection on. For verification purposes, this field is set to 00h.

Inconsistency flags: byte 1026: b7 to b3: reserved; b2: LRA IC_flag; b1: SRRI IC_flag; b0: TDFL IC_flag. If this field is not set to 00h, then the verification fails and the test is retried using a new disc.

Last recorded address of user data area.

TDMA sizes in SAs (define SA).

Next available PSNs of Test Zone: bytes 1088 to 1091: P_TZ0; bytes 1092 to 1095: P_TZ1. Each field specifies the first PSN of the next usable cluster available for testing and OPC procedures in the test zone (TZ). P_TZ0 equals the first PSN of a cluster within the test zone on layer 0 (00 0D E0 00h~00 0E DF 7Fh) or FF FF FF FFh. P_TZ1 equals the first PSN of a cluster within the test zone on layer 1 (01 F2 F0 00h~01 F3 EF FFh) or FF FF FF FFh. For an SL disc, P_TZ1=00 00 00 00h.

Next available PSNs of DCZ: bytes 1104 to 1107: P_TZ0; bytes 1108 to 1111: P_TZ1. Each field specifies the first PSN of the next usable cluster available for drive calibration procedures in the drive calibration zone (DCZ). P_CZ0 equals the first PSN of a cluster within the drive calibration zone on layer 0 (00 BD C3 E0h~00 BE 03 DFh) or FF FF FF FFh. P_CZ1 equals the first PSN of a cluster within the drive calibration zone on layer 1 (01 41 FC 20h~01 42 3C 1Fh) or FF FF FF FFh. For an SL disc, P_CZ1=00 00 00 00h.

First PSN of nth Cluster of Defect List: each field indicates the first PSN of the nth cluster of the latest TDFL. All PSNs set in these fields are PSNs in the same TDMA #. When there is no nth cluster of the latest TDFL, a P_nth DFL is set to 00 00 00 00h.

First PSNs of SRRI/SBM: bytes 1184 to 1187: P_SRR (this field indicates the PSN of the first sector of the latest SRRI). The PSN is a PSN in a TDMA. Bytes 1188 to 1191: 00h for verification purposes.

Next available PSNs of SA: each field indicates the first physical sector number of the next usable spare cluster in the SA. When an SA_size equals 0, the field is set to 00 00 00 00h. When an SA has no free spare clusters, the field is set to FF FF FF FFh.

Year/Month/Date of recording: this field is not checked for verification purposes.

Drive ID: Manufacturer Name/Additional ID/Unique Serial Number: this field is not checked for verification purposes.

Integrity of TDDS: P_nth DFL and P_SRR are in the TDMA indicated by the marked status of the TDMA access indicator clusters.

TDFL and DFL verification will now be described with reference to FIG. 22.

The latest TDFL is verified for a "Recording" test and a "Modification" test according to each recording mode. DFL is verified for a "Disc Closing" test. Contents of a DFL are the same as those of the latest TDFL.

FIG. 22 is a table of a checklist for TDFL verification according to an aspect of the invention. Referring to FIG. 22, the checklist for TDFL verification includes the following items.

DFL identifier.

DFL format.

DFL Update Count: this field specifies the total number of update operations of the defect list.

Number of DFL entries: this field specifies the total number of DFL entries.

Number of RAD/CRD entries: this field specifies the total number of DFL entries with Status 1=0000b or 1000b.

Number of NRD entries: this field specifies the total number of DFL entries with Status 1=0001b.

DFL entries: dependent on each verification mode, DFL entries are checked to determine if known defects and/or LOW caused them.

DFL terminator: b32 to b63 indicate DFL terminators, and b0 to b31 are the same as the DFL Update Count.

Integrity of DFL: the DFL entries are sorted in ascending order as if each entry were a single 64-bit unsigned integer of which the msb is ignored (always assumed to be 0), which means the DFL entries are first sorted by Status 1, and then within Status 1 by a defective cluster first PSN, and then within a defective cluster first PSN by Status 2, and then within Status 2 by a replacement cluster first PSN.

SRRI verification will now be described with reference to FIG. 23.

The latest SRRI is verified for a "Recording" test and a "Modification" test according to each recording mode. The SRRI in a DMA is verified for a "Disc Closing" test. Contents of SRRI in the DMA are the same as those of the latest SRRI.

FIG. 23 is a table of a checklist for SRRI verification according to an aspect of the invention. Referring to FIG. 23, the checklist for SRRI verification includes the following items.

SRRI identifier.

SRRI format.

SRRI Update Count: this field specifies the total number of update operations of the SRRI structure.

Number of SRR entries: this field indicates the total number of SRR entries.

Number of Open SRRs: this field indicates the number of SRRs with status Open.

List of Open SRR numbers: this field lists all SRR numbers with status Open.

SRR entries: dependent on each recording scenario, propriety of SRR entries is checked.

SRR terminator: b32 to b63 indicate DFL terminators, and b0 to b31 are the same as the SRRI Update Count.

Integrity of SRRI: the SRR entries are sorted in ascending order by "a Start PSN of the SRR #I" field.

DM verification will now be described with reference to FIGS. 24A and 24B, 25, and 26.

FIGS. 24A and 24B are tables of contents of test items for a "Recording" test and a "Modification" test according to an aspect of the invention. The test items include test items for the TDMA access indicators, test items for the latest TDDS, test items for the latest TDFL, and test items for the latest SRRI.

Test items for the TDMA access indicators are as follows.

Location: see FIG. 18.

Marked status: the number of written indicator clusters must be identical to the number of TDMs being used. After the "Modification" test, the marked status must indicate one of the next TDMSs of a TDMA indicating the disc image set.

Error condition of indicator cluster: an uncorrectable error is not allowed.

Contents of indicator cluster: all 32 data frames must include copy of the TDDS.

Integrity: pointers of TDFL and SRRI of a last TDDS must be included in a TDAM indicated by the indicator cluster.

Test items for the latest TDDS are as follows.

TDDS identifier.

TDDS update count: this field specifies the total number of update operations of the TDDS; 1≦N for a "Recording" test; k+1≦N for a "Modification" test (k: update count of the latest TDDS in a disc image set).

First PSN of drive area: 0 or first PSN of a cluster within drive area(s); drive area on layer 0: 00 0F. E4 00h~00 0F F3 FFh; drive area on layer 1: 01 F0 0C 00h~01 F0 1 B FFh.

First PSN of defect list.

Location of LSN 0 of user data area: 00 10 00 00h+ 32*ISA0_size.

Last LSN of user data area: for an SL disc: 32*(N_CL−ISA0_size−OSA_size)−1; for a DL disc: 32*(2*N_CL−ISA0_size−2*OSA_size−ISA1_size)−1.

Inner spare area 0 size: 00 00 10 00h.

Outer spare area 1 size: this field is set to N*256 (0≦N≦64 for an SL disc and 0≦N≦32 for a DL disc).

Inner spare area 1 size: this field is set to K*256 (K=0 for an SL disc and 0≦K≦64 for a DL disc).

Spare area full flags: depend on allocated SAs and number of replacement clusters by defect.

Recording Mode: b1=0 for LOW-off; b1=1 for LOW-on.

General flag bits: for verification purposes, this field is set to 00h.

Inconsistency flags: for verification purposes, LRA, SRRI, and TDFL are consistent. If this field is not set to 00h, then the verification fails and the test is retried using a new disc.

LRA (last recorded address) of user data: this field indicates the real LRA for verification purposes.

TDMA sizes in SAs: TDMA in ISA0=m*256 (0≦m≦16); TDMA in OSA=n*256 (0≦n≦N); TDMA in ISA1=k*256 (0≦k≦K).

DFL pointers: the nth field specifies the first PSN of the nth cluster of the latest TDFL. All PSNs set in these fields are PSNs in the same TDMA #. When there is no nth cluster of the latest TDFL, a P_nth DFL is set to 00 00 00 00h.

SRRI pointer: this field specifies the PSN of the first sector of the latest SRRI. The PSN set in this field is a PSN in a TDMA.

Next available PSNs of SAs: these fields indicate the first physical sector number of the next usable spare cluster in the SAs.

Integrity of TDDS: DFL pointers and an SRRI pointer are in the TDMA indicated by the TDMA access indicator clusters.

Test items for the latest TDFL are listed below.

DFL identifier.

DFL Update Count: this field specifies the total number of update operations of the defect list; 1≦N for a "Recording" test, k+1≦N for a "Modification" test (k: update count of the latest TDFL in a disc image set).

Number of DFL entries.

Number of RAD/CRD entries: this field specifies the total number of RAD+CRD entries in the DFL (each start and each end are counted separately as one entry).

Number of NRD entries: this field specifies the total number of NRD entries in the DFL.

Integrity of DFL entries: the compliance of the DFL entry format is checked. The TDFL contains DFL entries that were generated by known defects and/or LOW according to recording locations of a test scenario.

DFL terminator: b32 to b63: RBP is checked; b0 to b31 are the same as the DFL update count.

Blank area: no blank area between entries.

Integrity of DFL: sorting order: the DFL entries are sorted in ascending order as if each entry were a single 64-bit unsigned integer of which the msb is ignored (always assumed to be 0), which means the DFL entries are first sorted by Status 1, and then within Status 1 by a defective cluster first PSN, and then within a defective cluster first PSN by Status 2, and then within Status 2 by a replacement cluster first PSN; N_DFL, N_RAD/CRD, N_NRD: the real number of entries of each type is matched with a value of the field.

The test items for the latest SRRI are as follows.

SRRI identifier.

SRRI format.

SRRI update count: this field specifies the total number of update operations of the latest SRRI; 1≦N for a "Recording" test; k+1≦N for a "Modification" test (k: update count of the latest SRRI in a disc image set).

N_SRR: this field specifies the total number of the SRR entries in the SRRI.

Number of open SRRs: this field specifies the number of SRRs with status Open. The maximum value of this field is 16.

List of Open SRR numbers: this field lists all SRR numbers with status Open.

Integrity of SRR entries: the compliance of the SRR entry format is checked. The SRRI contains SRR entries that were generated by a test scenario.

SRR terminator: b32 to b63: RBP is checked; b0 to b31 are set to the SRRI update count.

Integrity of SRRI: SRR entries are sorted in ascending order by a "Start PSN" field.

FIG. 25 is a table of contents of test items for a "Disc Closing" test according to an aspect of the invention. The test items include test items for the TDMA access indicators, test items for the DDS, test items for the DFL, and test items for the SRRI.

Test items for the TDMA access indicators are as follows.
Location: see FIG. 18.
Marked status: all indicator clusters are recorded to an indicator DMA.
Error condition of indicator cluster: an uncorrectable error is not allowed.
Contents of indicator cluster: all 32 data frames contain a copy of the TDDS.
Test items for the DDS are the same as for the latest TDDS.
Test items for the DFL are the same as for the latest TDFL.
Test items for the SRRI are the same as for the latest SRRI.
The latest TDMS at the moment of closing is generated by a DM verifier with the TDMA mirror file which was extracted from a TD-Sm (TD-Dm) disc.

FIG. 26 is a table of contents of test items for a "Reading" test according to an aspect of the invention. The test items include a test item for the disc contents and a test item for the latest TDFL.

Disc contents: a DM verifier generates a reference data mirror file from the disc image set. This verification mode makes it possible to determine whether the drive to be tested correctly reads requested data based on TDFL entries.

The latest TDFL: indirect checking is performed by comparing contents of replacement clusters with data read from the test disc by the drive to be tested.

Aspects of the invention can also be embodied as a computer-readable medium encoded with processing instructions for implementing a method of verifying whether a recording and/or reproducing apparatus properly produces disc management information and records the disc management information on a disc according to aspects of the invention performed by a computer. The computer-readable medium may be any data storage device that can store data which can thereafter be read by a computer system, such as read-only memory (ROM), random-access memory (RAM), CD-ROMs, magnetic tapes, floppy disks, and optical data storage devices. Also, aspects of the invention may be embodied in computer-readable code embodied as a computer data signal in a carrier wave, or as data transmitted over a network, such as the Internet. The computer-readable medium can also be distributed over network-coupled computer systems so that the computer-readable code is stored and executed in a distributed fashion. Also, functional programs, code, and code segments for implementing the invention as computer-readable code can easily be written by a programmer skilled in the art to which the invention pertains.

As described above, an aspect of the invention provides a method of and an apparatus for verifying whether a recording and/or reproducing apparatus properly produces disc management information and records the disc management information on a disc.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A method of verifying whether a recording and/or reproducing apparatus that records and/or reproduces a disc comprising temporary defect management area (TDMA) information properly produces the TDMA information, the method comprising:
   producing as test information TDMA information produced by performing a recording test according to a series of recording operations based on a test scenario using a blank test disc; and
   providing a result of the recording test by confirming the test information using reference test information for the recording test,
   wherein the test information comprises TDMA access indicators.

2. The method of claim 1, wherein the series of recording operations based on the test scenario using the blank test disc is performed by commands issued by a recording module included in a verifier.

3. The method of claim 1, wherein the reference test information comprises information on TDMA information and TDMA access indicators that are expected to be normally produced when the recording test is performed according to the series of recording operations based on the test scenario using the blank test disc.

4. A verifier that confirms whether a recording and/or reproducing apparatus that records and/or reproduces a disc comprising TDMA information properly produces the TDMA information, the verifier comprising:
   a recording module that issues a series of commands to perform a recording test according to a series of recording operations based on a test scenario using a blank test disc;
   wherein the verifier receives as test information TDMA information produced from a test disc produced after performing the recording test, confirms the received test information based on reference test information, and provides a result of the recording test,
   wherein the test information comprises TDMA access indicators.

5. The verifier of claim 4, wherein the test information comprises a TDMA mirror file and an TDMA access indicators mirror file.

6. The verifier of claim 4, wherein the reference test information comprises information on TDMA information and TDMA access indicators that are expected to be normally produced when the recording test is performed according to the series of recording operations based on the test scenario using the blank test disc.

7. A method of verifying whether a drive that records a disc comprising temporary defect management area (TDMA) information properly records the TDMA information, the method comprising:
   recording predetermined data on a blank test disc with a drive to be tested according to a predetermined test scenario to generate a disc to be verified having TDMA information recorded thereon;

generating test information from the TDMA information recorded on the disc to be verified; and verifying whether the TDMA information was properly recorded on the disc to be verified by the drive to be tested based on the test information, wherein the test information comprises TDMA access indicators.

8. The method of claim 7, wherein the recording of the predetermined data comprises issuing drive-level WRITE instructions to the drive to be tested from a recording module in a verifier to control the drive to be tested to record the predetermined data on the blank test disc according to the predetermined test scenario, thereby generating the disc to be verified having the TDMA information recorded thereon.

9. The method of claim 7, wherein generating of the test information comprises generating disc management (DM) mirror files as the test information from the TDMA information recorded on the disc to be verified; and wherein the verifying comprises comparing the DM mirror files with reference DM mirror files generated from reference TDMA information that is expected to be recorded on the blank test disc when the predetermined data is recorded on the blank test disc according to the predetermined test scenario.

10. The method of claim 9, wherein the DM mirror files comprise a TDMA mirror file and a TDMA access indicators mirror file.

11. The method of claim 9, wherein the generating of the DM mirror files comprises reproducing the disc to be verified with a drive having a capability of generating the DM mirror files from the TDMA information recorded on the disc to be verified.

12. The method of claim 11, wherein the drive having the capability of generating the DM mirror files is a reference drive in a Blu-ray Disc (BD test center) or a drive modified by its manufacturer to have the capability of generating the DM mirror files.

13. A verifier that verifies whether a drive that records a disc comprising temporary defect management area (TDMA) information properly records the TDMA information, the verifier comprising:

a recording module that controls a drive to be tested to record predetermined data on a blank test disc according to a predetermined test scenario to generate a disc to be verified having TDMA information recorded thereon;

wherein the verifier:

receives test information generated from the TDMA information recorded on the disc to be verified, and verifies whether the TDMA information was properly recorded on the disc to be verified by the drive to be tested based on the test information, wherein the test information comprises TDMA access indicators.

14. The verifier of claim 13, wherein the recording module issues drive-level WRITE instructions to the drive to be tested to control the drive to be tested to record the predetermined data on the blank test disc according to the predetermined test scenario, thereby generating the disc to be verified having the TDMA information recorded thereon.

15. The verifier of claim 13, wherein the test information comprises disc management (DM) mirror files generated from the TDMA information recorded on the disc to be verified; and wherein the verifier verifies whether the TDMA information was properly recorded on the disc to be verified by comparing the DM mirror files with reference DM mirror files generated from reference TDMA information that is expected to be recorded on the blank test disc when the predetermined data is recorded on the blank test disc according to the predetermined test scenario.

16. The verifier of claim 15, wherein the DM mirror files comprise a TDMA mirror file and a TDMA access indicators mirror file.

17. The verifier of claim 15, wherein the DM mirror files are generated by reproducing the disc to be verified with a drive having a capability of generating the DM mirror files from the TDMA information recorded on the disc to be verified.

18. The verifier of claim 17, wherein the drive having the capability of generating the DM mirror files is a reference drive in a Blu-ray Disc (BD test center) or a drive modified by its manufacturer to have the capability of generating the DM mirror files.

* * * * *